US008606386B2

(12) United States Patent
Pereira

(10) Patent No.: US 8,606,386 B2
(45) Date of Patent: Dec. 10, 2013

(54) MULTI-AGENT SYSTEM FOR DISTRIBUTED MANUFACTURING SCHEDULING WITH GENETIC ALGORITHMS AND TABU SEARCH

(76) Inventor: Ana Maria Dias Medureira Pereira, Pedrouços (PT)

( * ) Notice: Subject to any disclaimer, the term of this patent is extended or adjusted under 35 U.S.C. 154(b) by 188 days.

(21) Appl. No.: 13/046,346

(22) Filed: Mar. 11, 2011

(65) Prior Publication Data

US 2011/0224816 A1    Sep. 15, 2011

Related U.S. Application Data

(60) Provisional application No. 61/313,210, filed on Mar. 12, 2010.

(51) Int. Cl.
*G06F 19/00* (2011.01)
*G06Q 10/00* (2012.01)

(52) U.S. Cl.
USPC .............. 700/100; 700/95; 700/96; 700/99; 700/102; 700/104; 705/7.12; 705/7.13

(58) Field of Classification Search
USPC ........ 700/99–104; 705/7.12–7.13, 7.22–7.28; 718/100–104
See application file for complete search history.

(56) References Cited

U.S. PATENT DOCUMENTS

| | | | | |
|---|---|---|---|---|
| 4,858,147 A * | 8/1989 | Conwell | ...................... | 706/19 |
| 5,155,679 A * | 10/1992 | Jain et al. | ...................... | 700/106 |
| 6,922,593 B2 * | 7/2005 | Weiss | ...................... | 700/30 |
| 6,988,017 B2 * | 1/2006 | Pasadyn et al. | ............... | 700/121 |
| 7,870,012 B2 * | 1/2011 | Katz et al. | ..................... | 705/7.26 |
| 7,899,770 B2 * | 3/2011 | Thie et al. | ....................... | 706/46 |
| 8,170,703 B2 * | 5/2012 | Domrose | ..................... | 700/100 |
| 2003/0149717 A1 * | 8/2003 | Heinzman | ..................... | 709/101 |
| 2004/0030428 A1 * | 2/2004 | Crampton et al. | ........... | 700/101 |
| 2005/0137734 A1 * | 6/2005 | Nieuwelaar et al. | .......... | 700/100 |
| 2005/0197875 A1 * | 9/2005 | Kauffman | ........................ | 705/7 |
| 2005/0221514 A1 * | 10/2005 | Pasadyn et al. | .................. | 438/14 |
| 2006/0101052 A1 * | 5/2006 | Netrakanti et al. | .......... | 707/102 |
| 2008/0168015 A1 * | 7/2008 | Thie et al. | ....................... | 706/46 |
| 2008/0215408 A1 * | 9/2008 | Pachon et al. | ..................... | 705/8 |
| 2009/0070158 A1 * | 3/2009 | Virine et al. | ..................... | 705/7 |
| 2009/0113442 A1 * | 4/2009 | Deidda et al. | ................. | 718/105 |
| 2009/0228129 A1 * | 9/2009 | Moyne et al. | ................. | 700/102 |
| 2009/0234482 A1 * | 9/2009 | Ide | ............................... | 700/100 |
| 2010/0114353 A1 * | 5/2010 | Domrose | ..................... | 700/100 |
| 2011/0112676 A1 * | 5/2011 | Izumi | ........................... | 700/101 |
| 2011/0166688 A1 * | 7/2011 | Moyne et al. | ................. | 700/104 |

* cited by examiner

*Primary Examiner* — Ramesh Patel
(74) *Attorney, Agent, or Firm* — Potomac Patent Group PLLC

(57) ABSTRACT

Computerized scheduling methods and computerized scheduling systems according to exemplary embodiments. A computerized scheduling method may be stored in a memory and executed on one or more processors. The method may include defining a main multi-machine scheduling problem as a plurality of single machine scheduling problems; independently solving the plurality of single machine scheduling problems thereby calculating a plurality of near optimal single machine scheduling problem solutions; integrating the plurality of near optimal single machine scheduling problem solutions into a main multi-machine scheduling problem solution; and outputting the main multi-machine scheduling problem solution.

27 Claims, 34 Drawing Sheets

MULTI-AGENT SYSTEM FOR DISTRIBUTED MANUFACTURING SCHEDULING WITH GENETIC ALGORITHMS AND TABU SEARCH

RELATED APPLICATIONS

This application is related to, and claims priority from, U.S. Provisional Patent Application Ser. No. 61/313,210 filed on Mar. 12, 2010, entitled "MULTI-AGENT SYSTEM FOR DISTRIBUTED MANUFACTURING SCHEDULING WITH GENETIC ALGORITHMS AND TABU SEARCH", the entire disclosure of which is incorporated herein by reference.

BACKGROUND

1. Field

Exemplary embodiments of the present invention relate generally to distributed manufacturing scheduling. More particularly, exemplary embodiments of the present invention relate to a multi-agent system for distributed manufacturing scheduling with Genetic Algorithms and Tabu Search.

2. Description of the Related Art

Planning of manufacturing systems may often involve the resolution of a large amount of varying combinatorial optimization problems. Such planning may have a significant impact on the performance of, for example, manufacturing organizations. Exemplary problems include the sequencing and scheduling problems in manufacturing management, as well as routing, transportation, design layout, and timetabling problems.

Scheduling may be defined as the assignment of time-constrained jobs to time constrained resources within a predefined time framework which may represent the complete time horizon of a schedule. A permissible schedule may satisfy a set of constraints imposed on jobs and resources. Accordingly, a scheduling problem may be defined as a decision making process for operations starting and resources to be used. A variety of characteristics and constraints may relate to jobs and a production system. For example, operation processing time, release and due dates, precedence constrains, and resource availability may all affect scheduling decisions.

Classical optimization methods may not be effective enough for the resolution of Job-Shop Scheduling Problems (JSSP).

BRIEF SUMMARY

According to an aspect of the invention, a computerized scheduling method may be provided. The method may be stored in a memory and executed on one or more processors. The method may include defining a main multi-machine scheduling problem as a plurality of single machine scheduling problems (SMSPs); independently solving the plurality of single machine scheduling problems thereby calculating a plurality of near optimal single machine scheduling problem solutions; integrating the plurality of near optimal single machine scheduling problem solutions into a main multi-machine scheduling problem solution; and outputting the main multi-machine scheduling problem solution.

According to another aspect of the invention, a computerized scheduling method may be provided. The method may be stored in a memory and executed on one or more processors. The method may include receiving a plurality of operation due dates for each of a plurality of jobs; receiving a plurality of operation release times for each of the number of jobs; grouping the plurality of operation due dates and the plurality of operation release times into a plurality of single machine scheduling problems; for each single machine scheduling problem, determining job release dates and job due dates based on the received operation due dates and operation release dates; independently solving the plurality of single machine scheduling problems using Tabu Search or a Genetic Algorithm thereby calculating a plurality of near optimal single machine scheduling problem solutions; integrating the plurality of near optimal single machine scheduling problem solutions into a main multi-machine scheduling problem solution; and outputting the main multi-machine scheduling problem solution.

According to another aspect of the invention, a computerized scheduling system may be provided. The computerized scheduling system may include a hybrid scheduling module. The hybrid scheduling module may include logic configured to define a main multi-machine scheduling problem as a plurality of single machine scheduling problems; independently solve the plurality of single machine scheduling problems thereby calculating a plurality of near optimal single machine scheduling problem solutions; integrate the plurality of near optimal single machine scheduling problem solutions into a main multi-machine scheduling problem solution; and output the main multi-machine scheduling problem solution.

According to another aspect of the invention, a computerized scheduling system may be provided. The computerized scheduling system may include a user interface to receive a plurality of operation due dates for each of a plurality of jobs, and to receive a plurality of operation release times for each of the number of jobs. The computerized scheduling system may further include a hybrid scheduling module. The hybrid scheduling module may include logic configured to: group the plurality of operation due dates and the plurality of operation release times into a plurality of single machine scheduling problems; for each single machine scheduling problem, determine job release dates and job due dates based on the received operation due dates and operation release dates; independently solve the plurality of single machine scheduling problems using Tabu Search or a Genetic Algorithm thereby calculating a plurality of near optimal single machine scheduling problem solutions; and integrate the plurality of near optimal single machine scheduling problem solutions into a main multi-machine scheduling problem solution. The user interface may output the main multi-machine scheduling problem solution.

The foregoing and other aspects will become apparent from the following detailed description when considered in conjunction with the accompanying drawing figures.

BRIEF DESCRIPTION OF THE DRAWINGS

FIGS. 6-33 are schematic representations of a user interface in accordance with an embodiment of the present invention.

DETAILED DESCRIPTION

Figure 1:
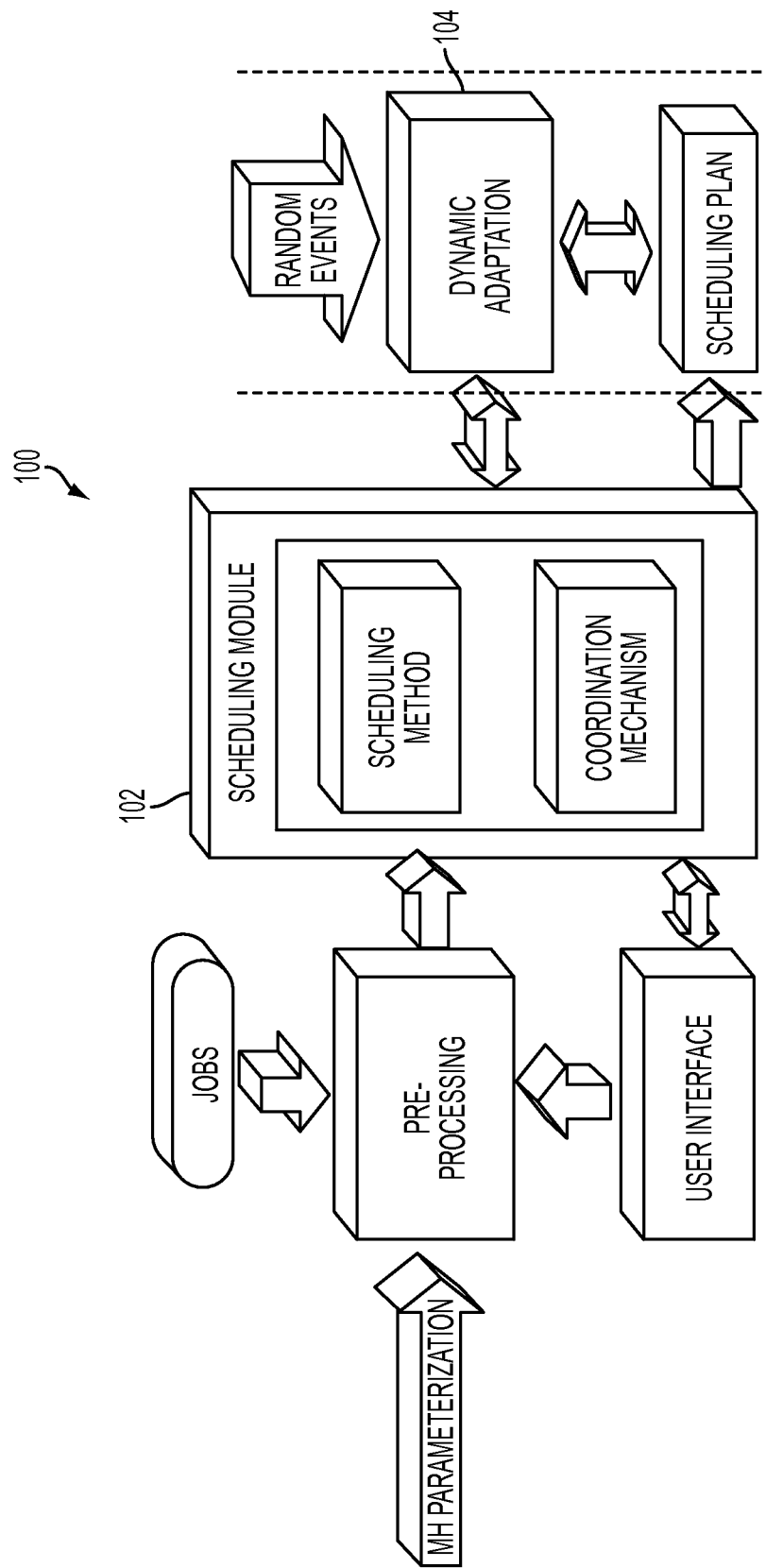
FIG. 1 is a schematic representation of a multi-agent system for distributed manufacturing scheduling with Genetic Algorithms and Tabu Search according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". Elements from an embodiment may be combined with elements of another. No element used in the description of this application should be construed as critical or essential to the invention unless explicitly described as such.

Many real-world multi-operation scheduling problems may be described as dynamic and extended versions of a job-shop scheduling combinatorial optimization problem (JSSP). Such a multi-machine scheduling problem may be expressed as, for example, a Job-Shop Scheduling Problem (JSSP), an Extended Job-Shop Scheduling Problem (EJSSP), or a Flow Shop Scheduling Problem (FSSP). It will be appreciated by those skilled in the art that although the exemplary embodiments herein may be discussed with reference to a particular type of multi-machine scheduling problem (e.g., an Extended Job-Shop Scheduling Problem (EJSSP)), the invention is not so limited. Turning to one such exemplary embodiment of the present invention, an extended job-shop scheduling problem (EJSSP) may be used in solving real-world multi-operation scheduling problems. EJSSP may include extensions and differences relative to a basic or classic JSSP. The existence of operations on a same job, of different parts and components, processed simultaneously on different machines, followed by component assembly operations may characterize EJSSP and may not be typical of scheduling problems addressed by the prior art (classical optimization methods). This approach to job definition, of emphasizing the importance of considering complex jobs which mimic customer orders of products, may be in accordance with real-world scheduling in manufacturing.

In practice, many scheduling problems may include an abundance of some restrictions and relaxation of others. Thus, for example, precedence constraints among operations of different jobs may be common. This may be so because often in, for example, discrete manufacturing, products may be made of several components that may be seen as different jobs whose manufacture must be coordinated. Additionally, since a job may be the result of manufacturing and assembly of parts at several stages, different parts of the same job may be processed simultaneously on different machines (concurrent or simultaneous processing).

Moreover, in practice, a scheduling environment tends to be dynamic. For example, new jobs may arrive at unpredictable intervals, machines may breakdown, jobs may be cancelled, and due dates and processing times may change frequently according to clients and market oscillation.

According to an embodiment of the present invention, EJSSP may be modeled including jobs, operations, and machines.

Jobs may include multiple aspects. A set of multi-operation jobs may be scheduled. $d_j$ may be the due date of job $J_j$. $t_j$ may be the initial processing time of job $J_j$. $r_j$ may be the release time of job $J_j$. There may be operations on the same job, on different parts and components, processed simultaneously on different machines, followed by component assembly operations (multi-level jobs). Jobs may include different job release dates $r_j$ and due dates $d_j$. Jobs may include job priorities definition, which may reflect the importance of satisfying respective due dates (similar to the weight assigned to jobs in scheduling theory). Precedence constraints may exist among operations of different jobs. There may exist operations on the same job with different parts and components processed simultaneously on different machines. New jobs may arrive at unpredictable intervals. Jobs may be cancelled. Finally, changes may occur in job attributes (e.g., processing, times, delivery dates, and priorities may change).

Operations may include multiple aspects. Each operation $O_{ijkl}$, may be characterized by the index (i, j, k, l) where i may define the machine where the operation k of job j may be processed and/the graph precedence operation level (level 1 may correspond to initial operations, without precedents). Precedence constraints may exist among operations of different jobs. Each job $J_j$, may include one or more operations $O_{ijkl}$. $IO_{ijkl}$ may be the time interval for starting operation $O_{ijkl}$. $r_{ijkl}$ may be the release time of operation $O_{ijkl}$. $t_{ijkl}$ may be the earliest time at which $O_{ijkl}$ may start. $T_{ijkl}$ may be the latest time at which $O_{ijkl}$ may start. $p_{ijkl}$ may be the processing time of the operation $O_{ijkl}$. $C_{ijkl}$ may be the k operation completion time from job j, level 1 on the machine. Each operation $O_{ijkl}$ may be processed on one machine of the set M, where $p_{ijkl}$ may be the processing time of operation $O_{ijkl}$ on machine M. There may be operations on the same job, on different parts and components, processed simultaneously on different machines, followed by component assembly operations (multi-level jobs).

Machines may include multiple aspects. A job shop may include a set of machines M1, . . . , Mn. A machine may process more than one operation on the same job (recirculation). Alternative machines, identical or not, may exist.

Turning back to jobs, a job may be defined as a manufacturing order for a final item that may be simple or complex. A job may be simple, like a part, requiring a set of operations to be processed. A job that may be simple may be defined as a simple product or a simple final item. A final item may be a complex final item, which may require processing of several operations on a number of parts followed by assembly operations at several stages.

Two different types of jobs may exist: jobs with linear structure; and jobs with concurrent operations. Jobs with linear structure may include operations that are sequentially processed, considering that an operation can be processed when its precedent has already been finished. Job-shop benchmark tests are typically are of this type. Jobs with concurrent operations may include operations of the same job which may be processed simultaneously. An operation can have more than one precedent operation (assembly operations) and more than one succeeding operation. This category may be common in complex final items.

FIG. 1 is a schematic representation of a multi-agent system for distributed manufacturing scheduling with Genetic Algorithms and Tabu Search 100 according to an embodiment of the present invention. The system 100 may include a hybrid scheduling module 102 and a dynamic adaptation module 104.

The hybrid scheduling module 102 may include a combination of Tabu Search and Genetic Algorithm based methods.

The hybrid scheduling module 102 may include a coordination mechanism (e.g., for inter-machine activity coordination). The coordination mechanism may coordinate the operation of machines taking into account technological constraints of jobs (i.e., job operations precedence relationships) towards obtaining good schedules.

The dynamic adaptation module 104 may include mechanisms for neighborhood/population regeneration under dynamic environments, increasing or decreasing neighbor/population according to new job arrivals or cancellations.

In the hybrid scheduling module 102, work solutions may be encoded by direct representation, where the schedule may be described as a sequence of operations (i.e., each position may represent an operation index with initial and final processing times). Each operation may be characterized by the index (i, j, k, l), where i may define the machine where operation k may be processed, j the job to which the operation may belong, and/the graph precedence operation level (level 1 may correspond to initial operations without precedents.)

Initially, a deterministic EJSSP may be decomposed into a series of deterministic SMSPs. That is, in a first phase, a first Job-Shop schedule may be found based on integration of all SMSP. Job due dates dj may exist. Accordingly, in a first operation, completion time estimates (due dates di) for each operation of each job may be defined (e.g., operation due dates may be input). Different and known job release times $r_j$ may exist, prior to which no processing of a job may be done. Accordingly, in a second operation, an interval between starting time estimates (release times) may be defined for all operations of each job (e.g., operation release times may be input). At this stage, only technological precedence constraints of operations and job due dates may be considered for defining completion and starting times. Based on the job release times $r_j$ and the job due dates $d_j$, release dates $r_j$ and due dates $C_{max}$ may be determined for each SMSP. That is, in a third operation, all SMSP $1|r_j|C_{max}$ may be defined based on information defined in the first two operations. The release date $r_j$ may correspond to the earliest starting times of each operation. The due date $d_j$ may correspond to operation completion times. The notion $r_j$ and $d_j$ used at this point may consider that at present, Single Machine Scheduling Problems are being addressed. Subsequently, each SMSP may be solved independently by Tabu Search or a Genetic Algorithm (considering a self-parameterization issue). That is, in a fourth operation, all SMSP $1|r_j|c_{max}$ may be solved with the defined release times and due dates using Tabu Search or a Genetic Algorithm. Afterwards, the solutions obtained for each SMSP may be integrated to obtain a solution to the main EJSSP instance. That is, in a fifth operation, all of the obtained near-optimal solutions may be integrated into the main problem. In a second phase, the feasibility of the schedule may be checked, and, if necessary, a coordination mechanism may be applied. Accordingly, in a sixth operation, that the integrated optimal solutions are a feasible solution and that the obtained near optimal solutions terminate with a local optimum may be verified. If not, a repairing mechanism may be applied.

As noted above, the hybrid scheduling module 102 may include a coordination mechanism. The integration of the SMSP solutions (fifth operation above) may provide an unfeasible schedule to the EJSSP. That may be why schedule repairing may be necessary to obtain a feasible solution. The coordination mechanism may be an inter-machine activity coordination mechanism (IMACM). Repairing may be carried out through coordination of machine activity, taking into account job operation precedence and other problem constraints. Repairing may be performed keeping job allocation order, in each machine, unchanged. The IMACM may establish the starting and the completion times for each operation. The IMACM may ensure that the starting time for each operation is the higher of the two following values: 1. The completion time of the immediately precedent operation in the job, if there are is only one, or the highest of all precedent operations if there is more than one, or 2. The completion time of the immediately preceding operation on the machine.

As noted above the system 100 may include a dynamic adaptation module 104. For nondeterministic problems, some or all parameters may be uncertain (i.e., may not be fixed as may be assumed in a deterministic problem). Non-determinism of variables may be taken into account in real world problems. For generating acceptable solutions in such circumstances, a predictive schedule may initially be generated using the available information and then, if perturbations occur in the system 100 during execution, the schedule may have to be modified or revised accordingly (i.e., rescheduling may be performed). In the system 100, rescheduling may be necessary due to two classes of events: 1) Partial events which may imply variability in jobs or operation attributes such as processing times, due dates, and release times; and 2) Total events which may imply variability in neighborhood structure, resulting from either new job arrivals or job cancellations. Considering the processing times involved in a high frequency of perturbations, rescheduling all jobs from the beginning should be avoided. However, if work has not yet started and time is available, then an approach to rescheduling would be to restart the scheduling from scratch with a new modified solution on which takes into account the perturbation (e.g., a new job arrival). When there is not enough time to reschedule from scratch or job processing has already started, a strategy may be used which adapts the current schedule taking into consideration the kind of perturbation occurred.

The occurrence of a partial event may require redefining job attributes and a reevaluation of the schedule objective function. A change in a job due date may require recalculation of the operation starting and completion due times of all respective operations. However, changes in the operation processing times may only require recalculation of the operation starting and completion due times of the succeeding operations. A new job arrival may require definition of the correspondent operation starting and completion times and a regenerating mechanism to integrate all operations on the respective single machine problems. In the presence of a job cancellation, the application of a regenerating mechanism may eliminate the job operations from the SMSP where they appear.

After the insertion or deletion of genes (jobs or operations), population regeneration may be performed by updating the size of the population and ensuring an identical structure to the existing one. Then, the scheduling module may apply the search process for better solutions with the new modified solution.

When a new job arrives to be processed, an integration mechanism may be needed. The dynamic adaptation module 104 may include a job arrival integration mechanism. The integration mechanism may analyze the job precedence graph that may represent the ordered allocation of machines to each job operation, and may integrate each operation into the respective SMSP. Two alternative procedures may be used for each operation: 1) Random selection of one position to insert the new operation into the current solution/chromosome; or 2) Use of an intelligent mechanism to insert this operation into the schedules based on, for example, on job priority.

The dynamic adaptation module 104 may include a job elimination mechanism. When a job is cancelled, an eliminating mechanism may be implemented so the correspondent position/gene may be deleted from all solutions.

The dynamic adaptation module 104 may include regeneration mechanisms. After integration/elimination of operations is carried out, by inserting/deleting positions/genes in the current solution/chromosome, population regeneration may be performed by updating the population size. The population size for each SMSP may be proportional to the number of operations.

After the dynamic adaptation process, the scheduling method may be applied and may search for better solutions with the modified solution. That is, the modified solution may be passed from the dynamic adaptation module 104 to the hybrid scheduling module 102.

Meta-Heuristics may be adapted to deal with dynamic problems, reusing and changing solutions/populations in accordance with the dynamism.

Figure 2:
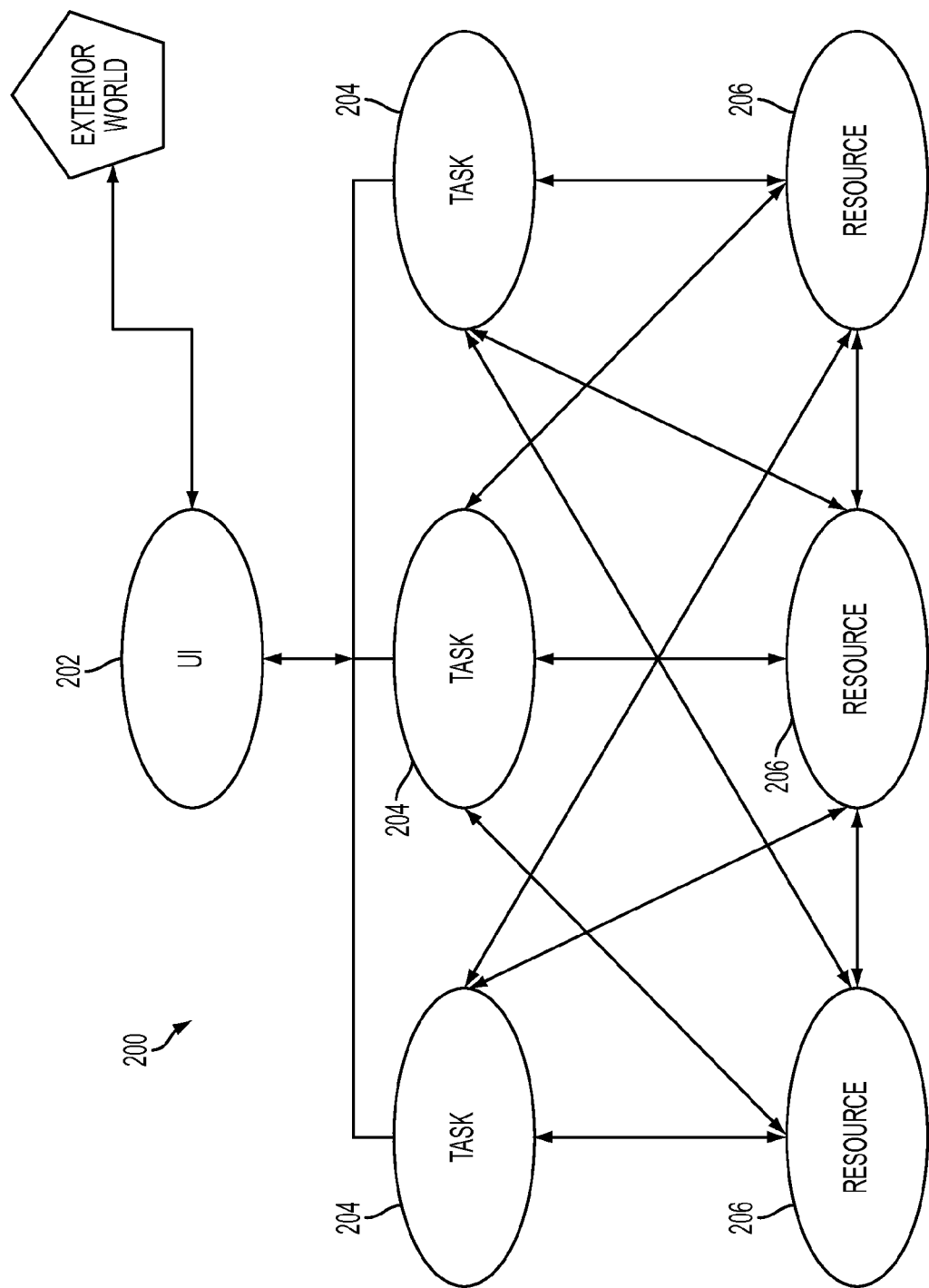
FIG. 2 is a schematic representation of the system architecture of the multi-agent system for distributed manufacturing scheduling with Genetic Algorithms and Tabu Search of FIG. 1.

FIG. 2 is a schematic representation of the system architecture 200 of the multi-agent system for distributed manufacturing scheduling with Genetic Algorithms and Tabu Search 100 of FIG. 1. The system architecture 200 may include a user interface agent 202, job (or task) agents 204, and resource agents 206. The system architecture 200 may include a community of distributed, autonomous, cooperating and asynchronously communicating machines solving a scheduling problem. The teamwork-based approach may differ from prior art approaches in that implemented is a system where each resource agent 206 may be responsible for optimizing the scheduling of operations for one machine through Tabu Search or Genetic Algorithms. Such may be considered a specific kind of social interaction that may be cooperative problem-solving where a group of resource agents 206 may work together to achieve a good solution for the problem.

Each resource agent 206 may be able to find an optimal or near optimal local solution through Tabu Search meta-heuristics (or Genetic Algorithms). Each resource agent 206 may be able to deal with system dynamism (e.g., new jobs arriving, canceled jobs, changing job attributes, etc.). Each resource agent 206 may be able to change/adapt the parameters of the basic algorithm according to the current situation.

As noted above, a scheduling problem may be decomposed into a series of SMSP. The resource agents 206 (which have a meta-heuristic associated therewith) may obtain local solutions and later cooperate in order to overcome inter-agent constraints and achieve a global schedule.

Figure 3:
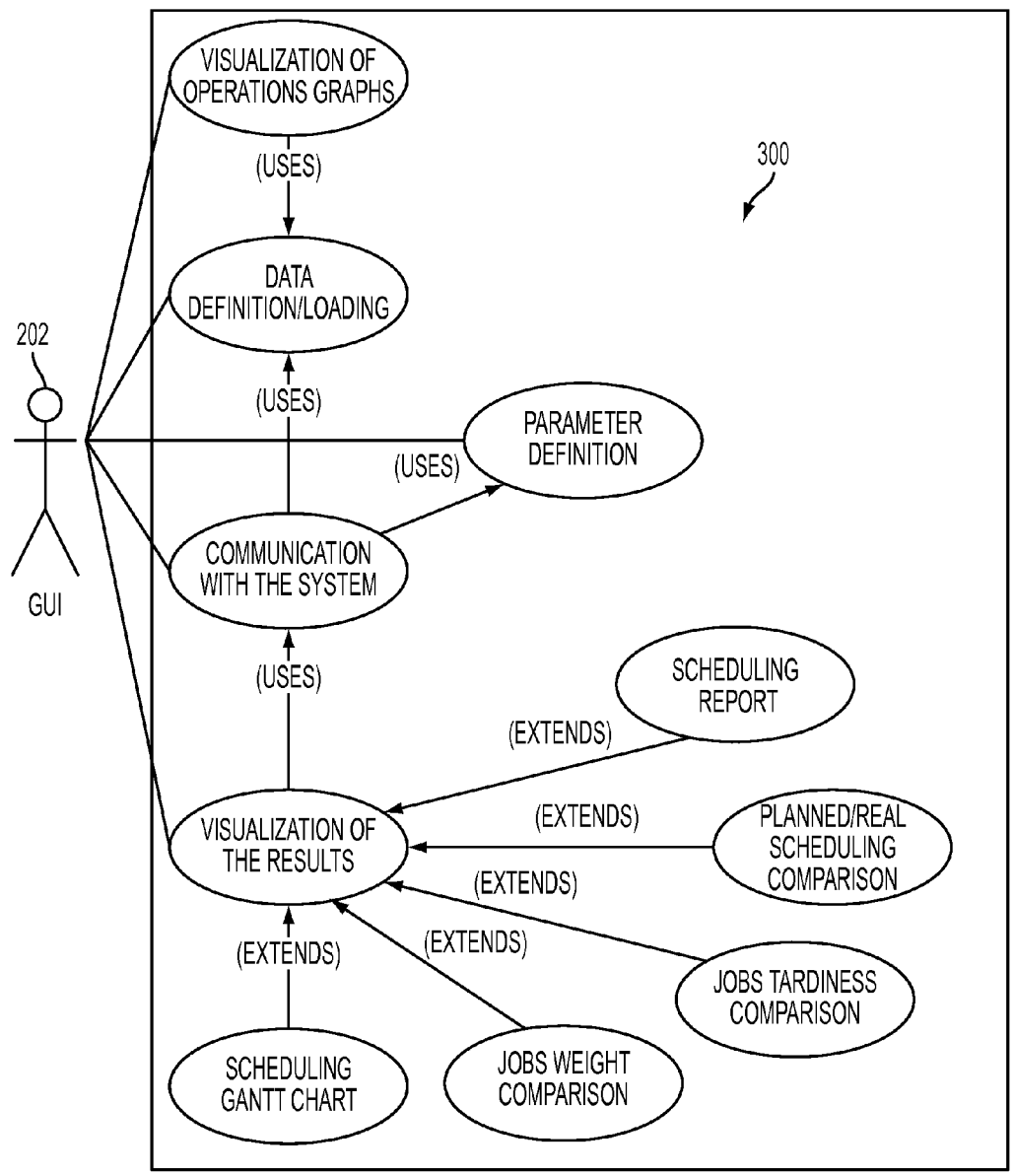
FIG. 3 is a schematic representation of user interface agent functionalities.

FIG. 3 is a schematic representation of user interface agent 202 functionalities 300. The user interface agent 202 may be implemented to allow communication with the user. The user interface agent 202, apart from being responsible for the user interface, may generate necessary job agents 204 dynamically according to the number of jobs that comprise a scheduling problem and assign each job to the respective job agent 204.

Figure 4:
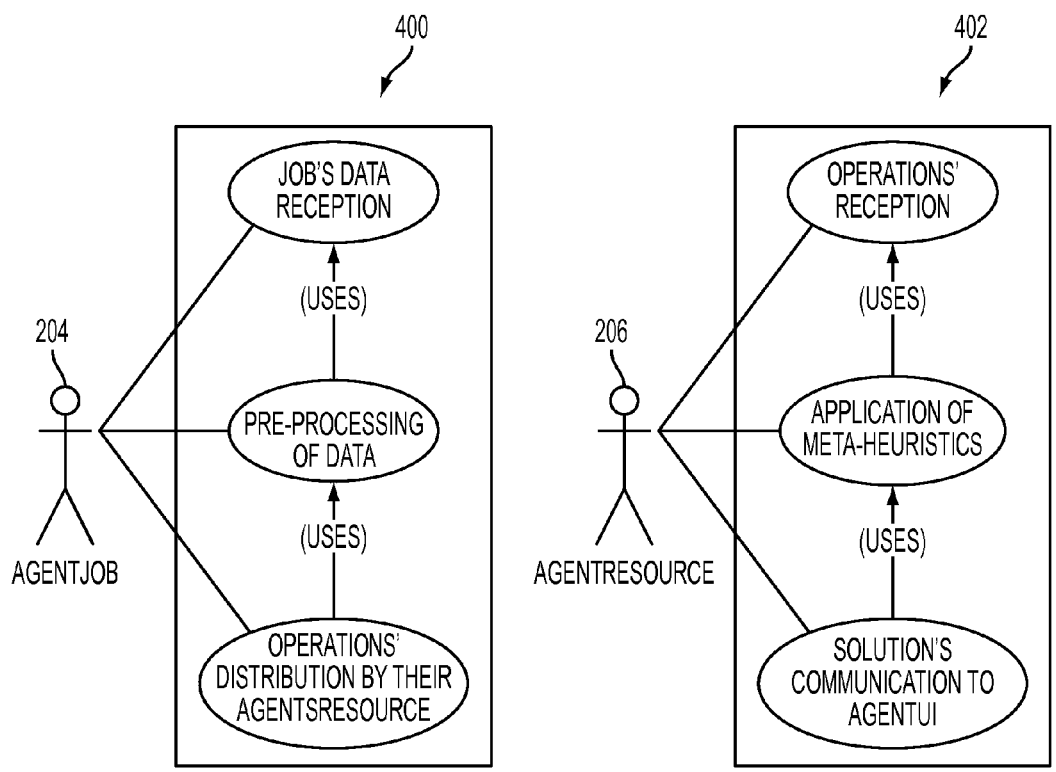
FIG. 4 is a schematic representation of job agent functionalities and resource agent functionalities.

FIG. 4 is a schematic representation of job agent 204 functionalities 400 and resource agent 206 functionalities 402. A job agent 204 may process the necessary information about a job. In other words, the job agent 204 may be responsible for the generation of the earliest and latest processing times, the verification of feasible schedules and identification of constraint conflicts on each job, and the decision of which machine agent may be responsible for solving a specific conflict.

The resource agent 206 may be responsible for scheduling of the operations that may require processing in the machine supervised by the agent. The resource agent 206 may implement meta-heuristic and local search procedures in order to find the best possible operation schedules and may communicate the solutions to the task agent 204 for later feasibility check.

Figure 5A:
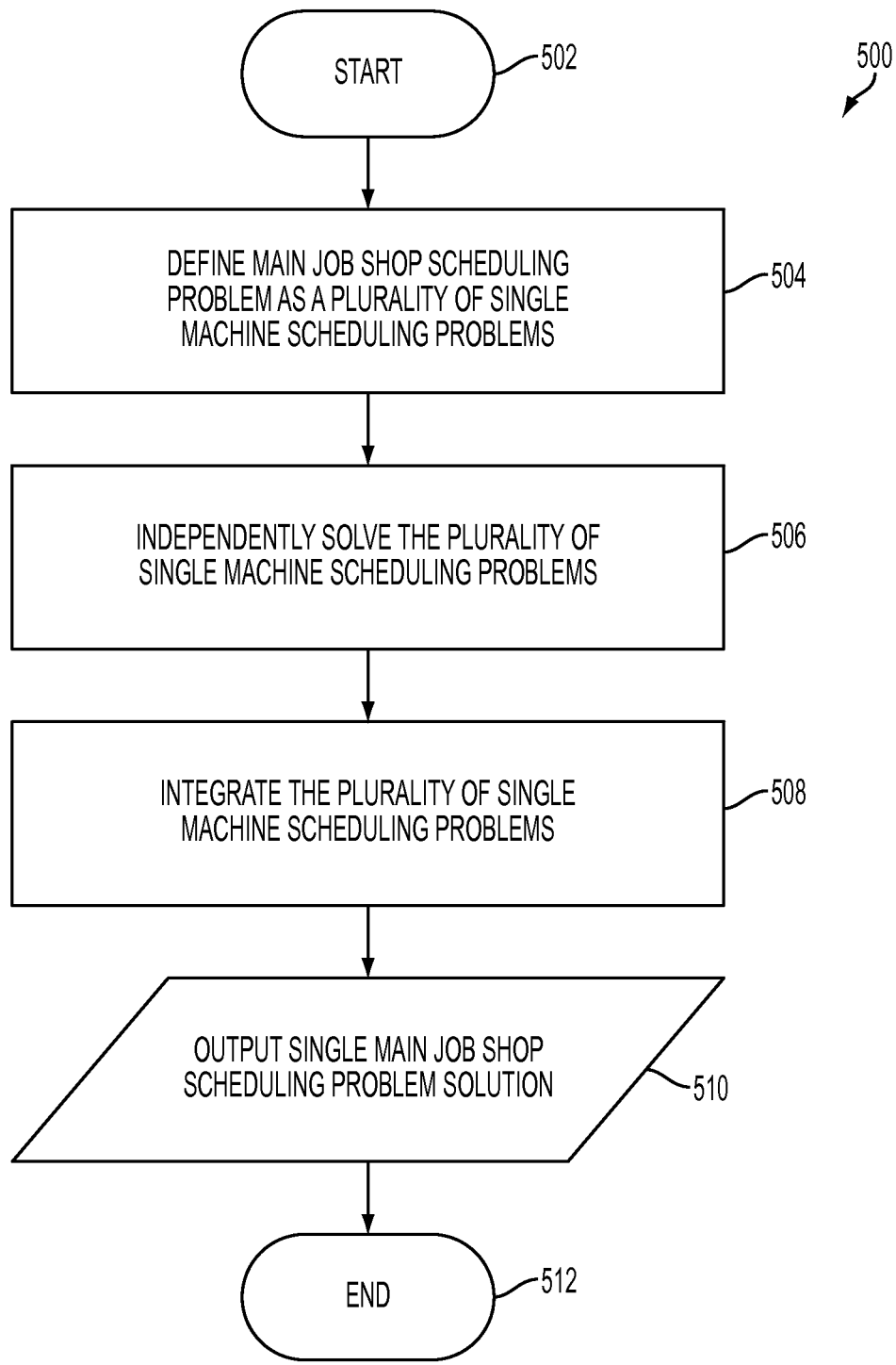
FIGS. 5A-B are flowcharts of scheduling methods according to exemplary embodiments of the present invention.
Figure 5B:
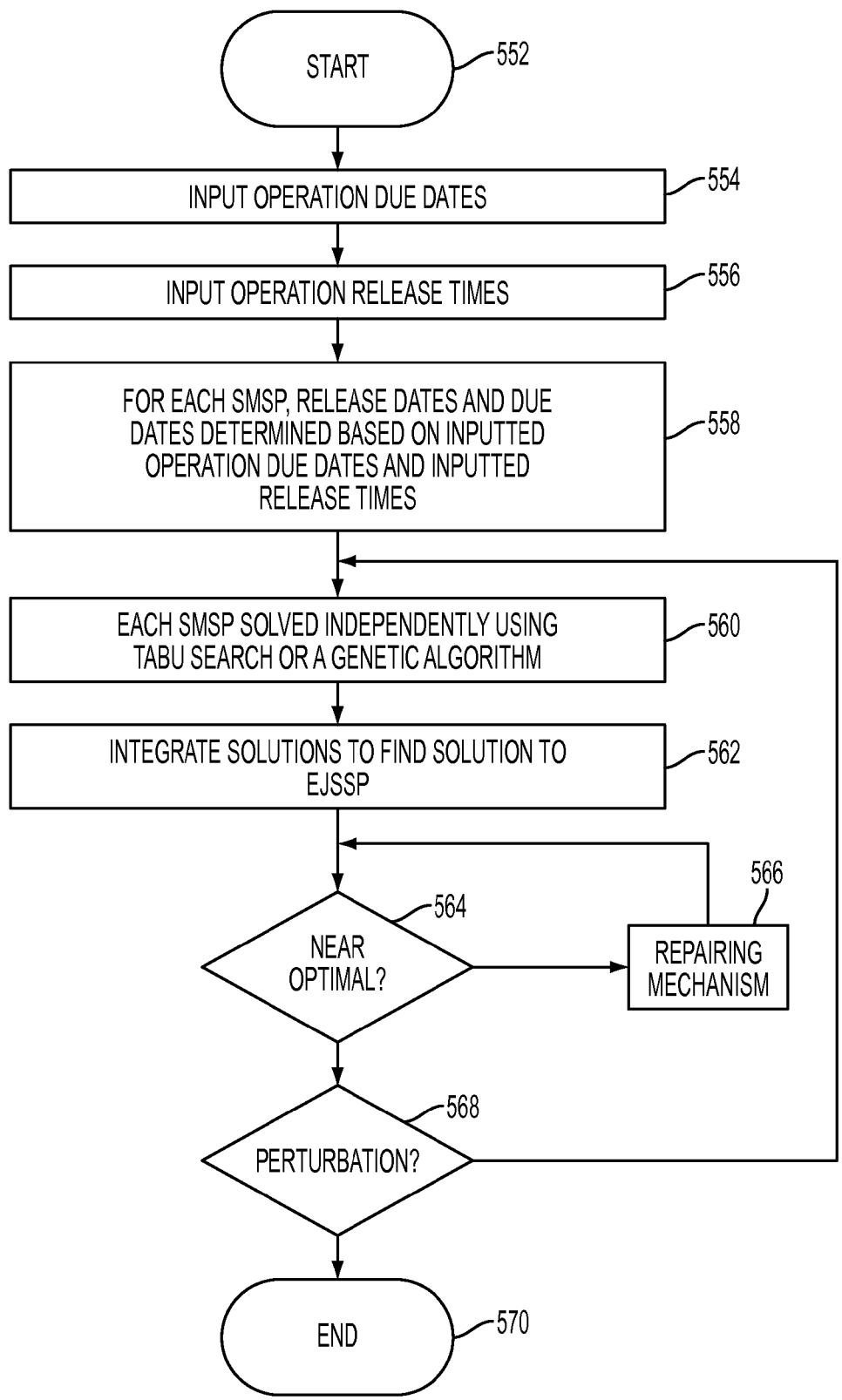

The operation of the system 100 is described with reference to FIGS. 5A-33. FIGS. 5A-B are flowcharts of scheduling methods 500 and 550 according to exemplary embodiments of the present invention. FIGS. 6-33 are schematic representations of a user interface 101 in accordance with an embodiment of the present invention.

Turning to FIG. 5A, in operation 502, the scheduling method 500 may begin. In operation 504, a main Job-Shop Scheduling Problem may be defined as a plurality of single machine scheduling problems. In operation 506, the plurality of Single Machine Scheduling Problems (SMSP) may be independently solved thereby calculating a plurality of Single Machine Scheduling Problem solutions. The plurality of Single Machine Scheduling Problems may be independently solved using Tabu Search or a Genetic Algorithm.

In operation 508, the plurality of Single Machine Scheduling Problem solutions may be integrated into a main Job-Shop Scheduling Problem solution. The feasibility of the main Job-Shop Scheduling Problem solution may be verified. Verification may include verifying near optimal solutions terminate with a local optimum. If the single main Job-Shop Scheduling Problem solution is not feasible, a repairing mechanism may be applied to the single main Job-Shop Scheduling Problem solution.

After integrating the plurality of near optimal Single Machine Scheduling Problem solutions into the single main Job-Shop Scheduling Problem solution, at least one of the near optimal single machine scheduling problems may be modified (e.g., a job may be added or deleted, or a job instruction may be modified). Thereafter, the operations of independently solving the plurality of single machine scheduling problems, including the modified at least one near optimal single machine scheduling problem, and integrating the plurality of near optimal single machine scheduling problem solutions into the single main Job-Shop Scheduling Problem solution may be repeated.

In operation 510, the single main Job-Shop Scheduling Problem solution may be output. The method may proceed to operation 512 and end.

Turning to FIG. 5B, in operation 552, the scheduling method 550 may begin. As noted above, a deterministic EJSSP may initially be decomposed into a series of deterministic SMSPs. In operation 554, operation due dates for each of a number of jobs may be input. In operation 556, operation release times for each of the number of jobs may be input. In operation 558, for each SMSP, release dates and due dates may be determined based on the input operation due dates and release dates.

Figure 6:
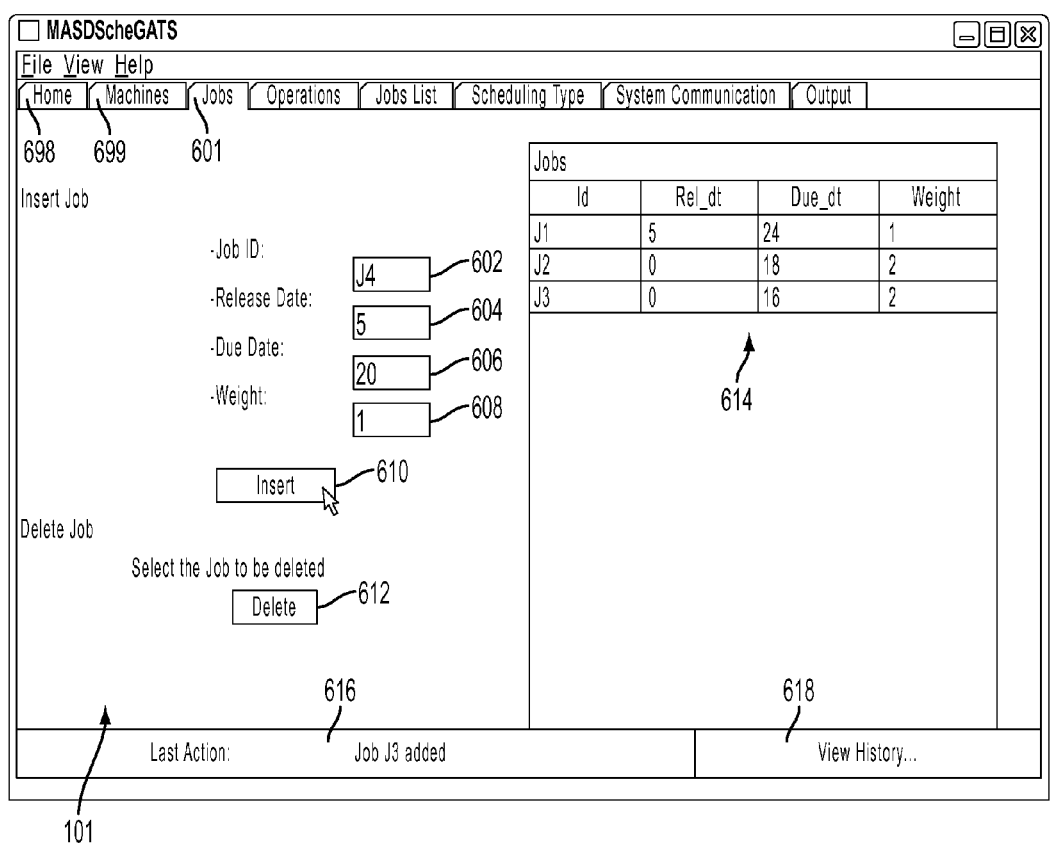

Turning to FIG. 6, the user interface 101 may include a number of tabs. For example, the user interface 101 may include a home tab 698 which, when selected, may display an initial system screen. The user interface 101 may include a machines tab 699 which, when selected, may allow for the entering and viewing of data regarding machines into the system 100.

Jobs may be defined in the system 100 by entering the jobs into the user interface 101. The user interface 101 may include a jobs tab 601. When the jobs tab 601 is selected, the user interface 101 may include a job ID input field 602, a release date input field 604, a due date input field 606, and a weight (i.e., priority) input field 608. In the exemplary depiction, J4 is entered into the job ID input field 602, 5 is entered into the release date field 604, 20 is entered into the due date field 606, and 1 is entered into the weight field 608.

The user interface 101 may include an insert control 610 and a saved jobs table 614. When selected, the insert control 610 may save the entered job data. Saved job data may be displayed in the saved jobs table 614. In the exemplary depiction, the saved jobs table 614 includes three saved jobs, J1, J2, and J3. J1 includes a release date of 5, a due date of 24, and a weight of 1. J2 includes a release date of 0, a due date of 18, and a weight of 2. J3 includes a release date of 0, a due date of 16, and a weight of 2.

The user interface 101 may include a delete control 612. When selected, the delete control 612 may delete a job selected in the saved jobs table. The user interface 101 may include a last action indicator 616 and a view history control 618. The last action indicator 616 may display the last action performed by the system 100. When the view history control 618 is selected, a historic of past actions performed by the system 100 may be displayed.

Figure 7:
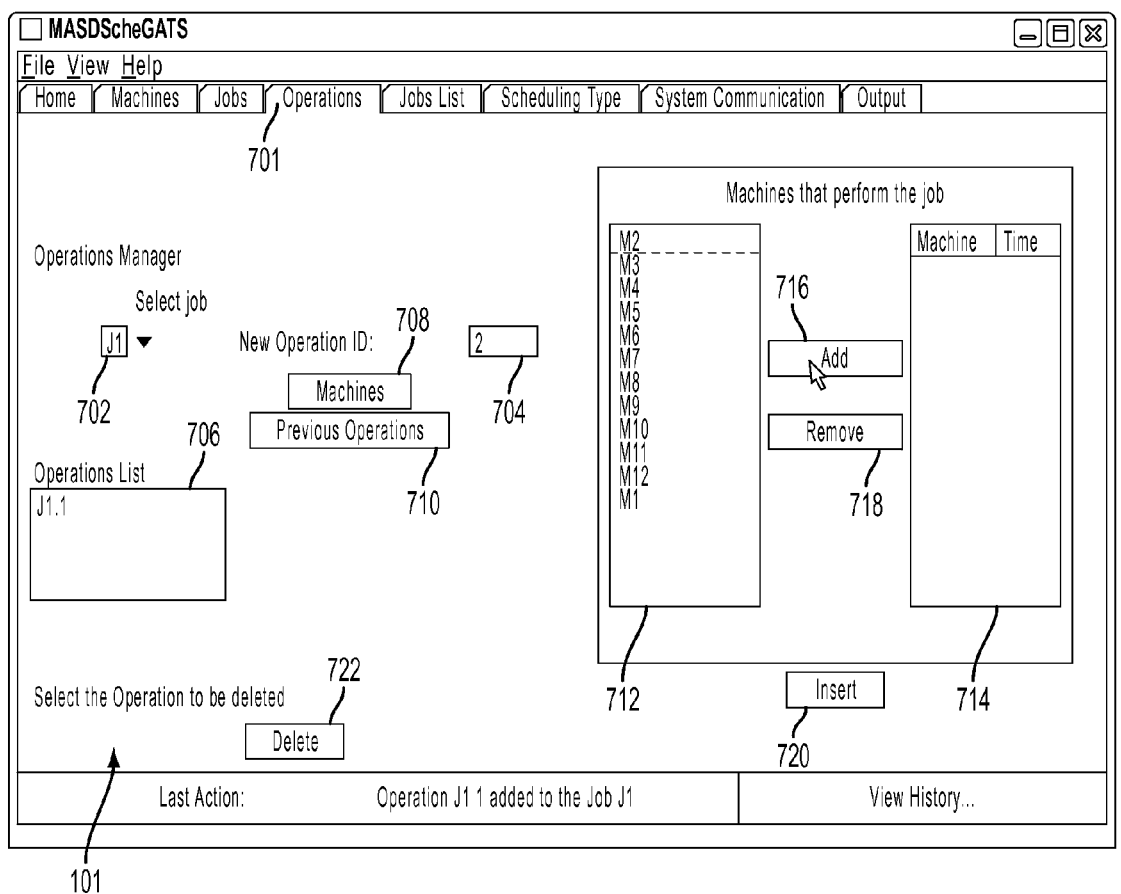
Figure 8:
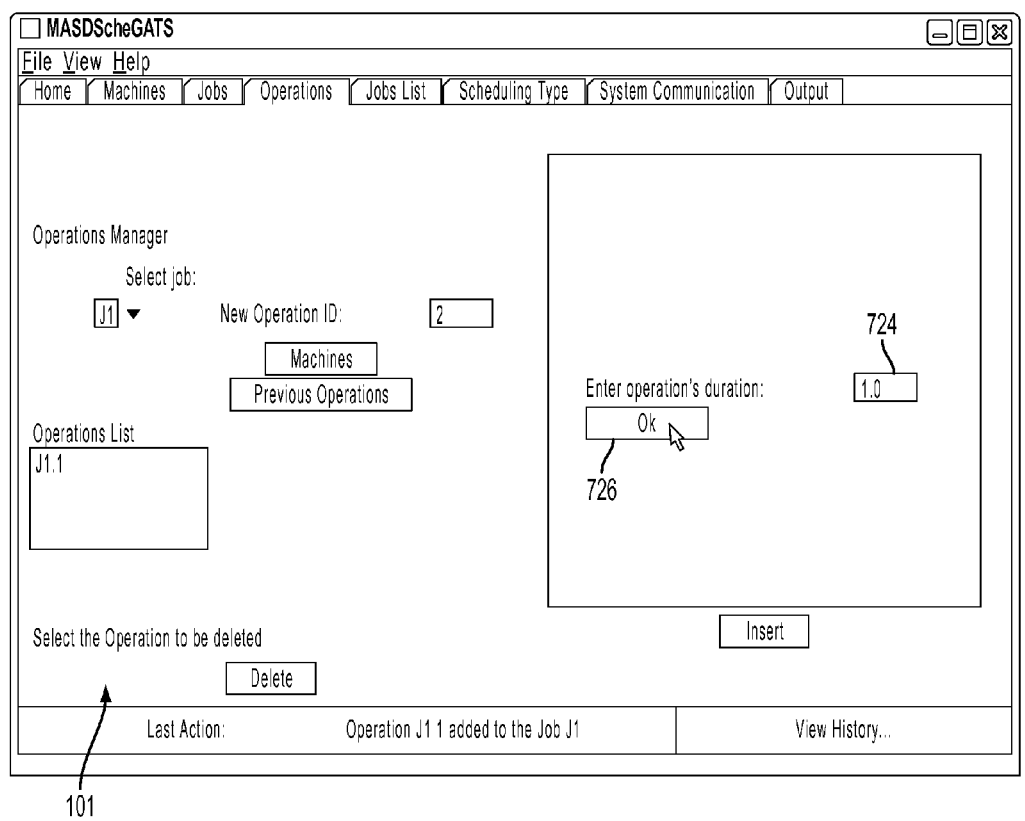
Figure 9:
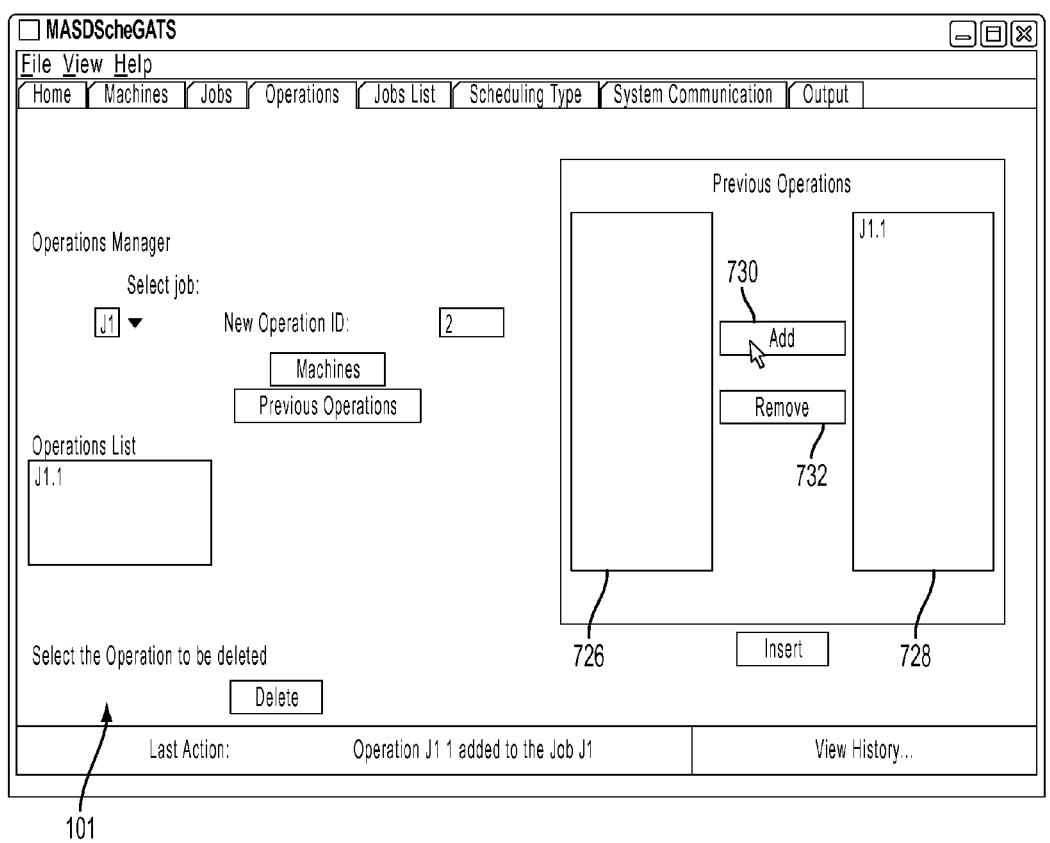

Turning to FIG. 7, a production order (i.e., job routing) may be defined in the system 100 for each job. In the exemplary depiction, each job may include three operations or instructions (each operation to be performed on each of the three machines). The user interface 101 may include an operations tab 701. When the operations tab 701 is selected, the user interface 101 may include a job indicator/selector 702, a new operation ID input field 704, an operations list 706, a machines control 708, a previous operations control 710, an available machines list 712, a selected machines list 714, an add machine control 716, a remove machine control 718, an insert control 720, and a delete control 722. When selected, the machines control 708 displays the available machines list 712, the selected machines list 714, the add machine control 716, and the remove machine control 718. In the exemplary depiction, J1 (i.e., job 1) is indicated/selected by the job indicator/selector 702. 2 is entered into the new operation ID input filed 704 indicating that operation 2 of job 1 is being defined. Operation J1.1 is included in the operations list 706 indicating that operation 1 for job 1 is already saved. In this exemplary depiction, operation J1.1 includes no precedents and runs on the machine M1 with a processing time equal to 5.

Turning back to operation J1.2, in this exemplary depiction the available machines list 712 includes machines M1 through M12. Machine M2 is highlighted and the add machine control 716 is being selected. This may indicate that operation J1.2 is performed on machine M2.

Upon selection of the add machine control 716, the user interface 101 may include an enter operation duration (processing time) input field 724 (FIG. 8) and an OK control 726. In the exemplary depiction, 10 is entered into the operation duration field 724, and the OK control 726 is being selected. This may indicate that operation J1.2 has a duration of 10.

Upon selection of the previous operations control 710, an available previous operations list 726 (FIG. 9), an add previous operation control 730, a remove previous operation control 732, and a selected previous operations list 728 may be displayed. In the exemplary depiction operation J1.1 has been added from the available previous operations list to the selected previous operations list 728. This may indicate that operation J1.2 has a precedent, that is the operation J1.1.

This production order may continue to be input into the system 100 in like manner. In this exemplary depiction, operation J1.3 is processed by a 4 time units by machine M3 and has the precedence of J1.2. For task J2, the operation J2.1 has no precedents and is performed by machine M3 for 4 time units. Operation J2.2 is processed by machine M1 with a processing time equal to 5 time units and has the precedents of operation J2.1. The operation J2.3 is processed by machine M2 for 6 time units and it is preceded by the operation J2.2. For task J3, the operation J3.1 is processed by machine M3 with a processing time equal to 5 time units and has no precedents. Operation J3.2 is processed by machine 2 for 3 time units and had a precedence of operation J3.1. Operation J3.3 has precedence of operation J3.2 and is performed by machine M1 for 7 time units. For task J4, operation J4.1, without precedents, is processed on machine M2 with a processing time equal to 5 time units. Operation J4.2 may be processed on machine M1 and have seven units of time and have a precedence of J4.1. Operation J4.3 is preceded by operation J4.2, and is processed by machine M3 for 3 time units.

Figure 10:
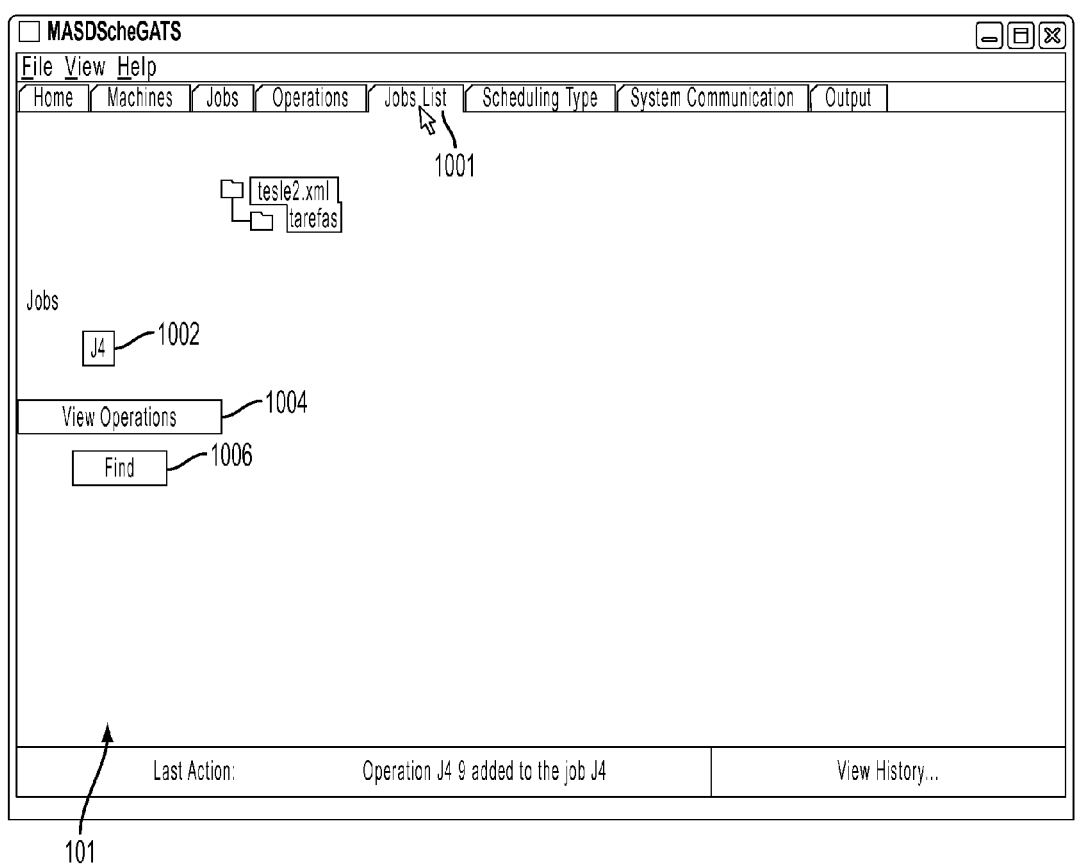
Figure 11:
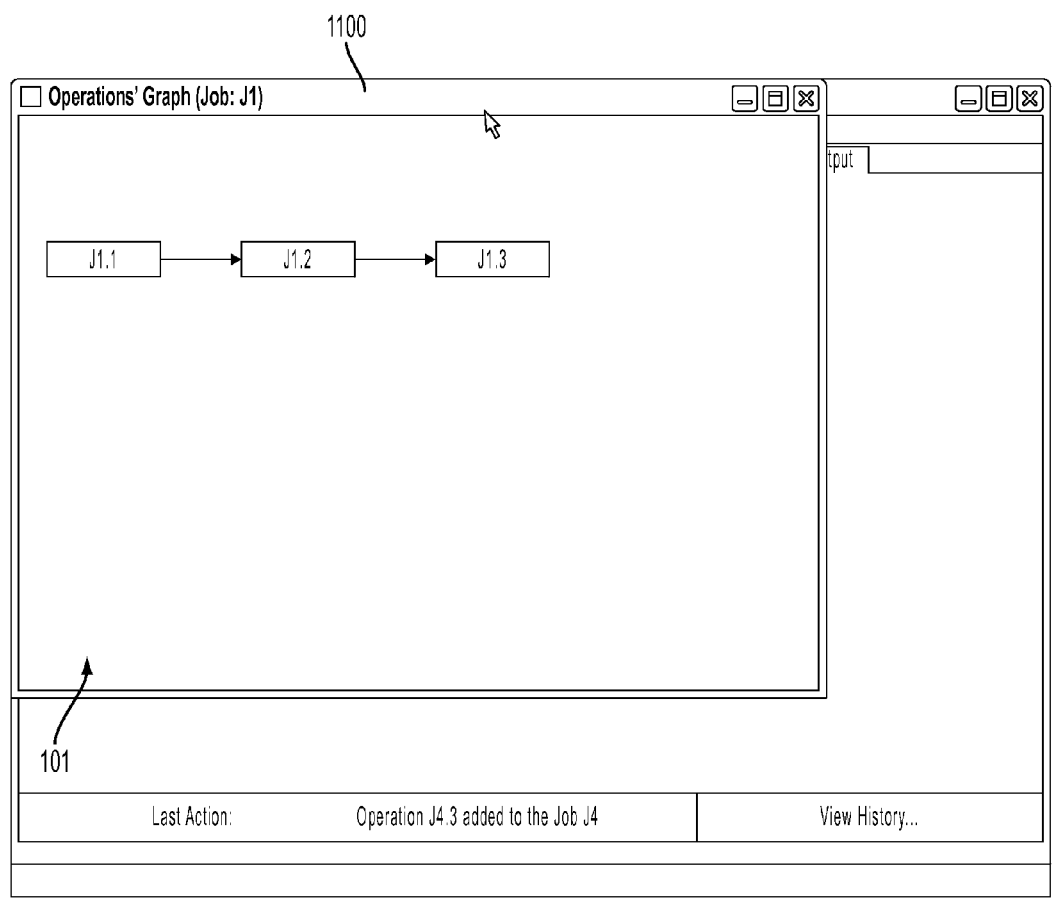

Turning to FIG. 10, after the production order has been input into the system 100, it may be possible to view a graph of the operations of each job. The order of precedents among the operations may be viewed. The user interface 101 may include a jobs list tab 1001. When the operations tab 1001 is selected, the user interface 101 may include a job indicator/selector 1002, a view operations control 1004, and a find control 1006. When a job is listed in the indicator selector 1002 and the view operations control 1004 is selected, a graph 1100 (FIG. 11) of the operations of the selected job may be displayed by the user interface 101. In the exemplary depiction, job J4 is indicated/selected by the job indicator/selector 1002. Job J1 is thereafter selected using the job indicator/selector 1002, the view operations control 1004 is selected, and the order of precedents among operations J1.1, J1.2, and J1.3 are displayed on the graph of 1100.

Turning back to FIG. 5B, in operation 560, each SMSP may be solved independently using Tabu Search or a Genetic Algorithm. In operation 562, the solutions of each SMSP may be integrated to find a solution to the EJSSP. In operation 564, a determination may be made whether the solution to the EJSSP is near optimal. If it is determined that the solution to the EJSSP is not near optimal (or feasible), the method 550 may proceed to operation 566 in which a repairing mechanism may be applied. Thereafter, operation 564 may be repeated. If it is determined that the solution to the EJSSP is near optimal, the method 550 my proceed to operation 568.

Figure 12:
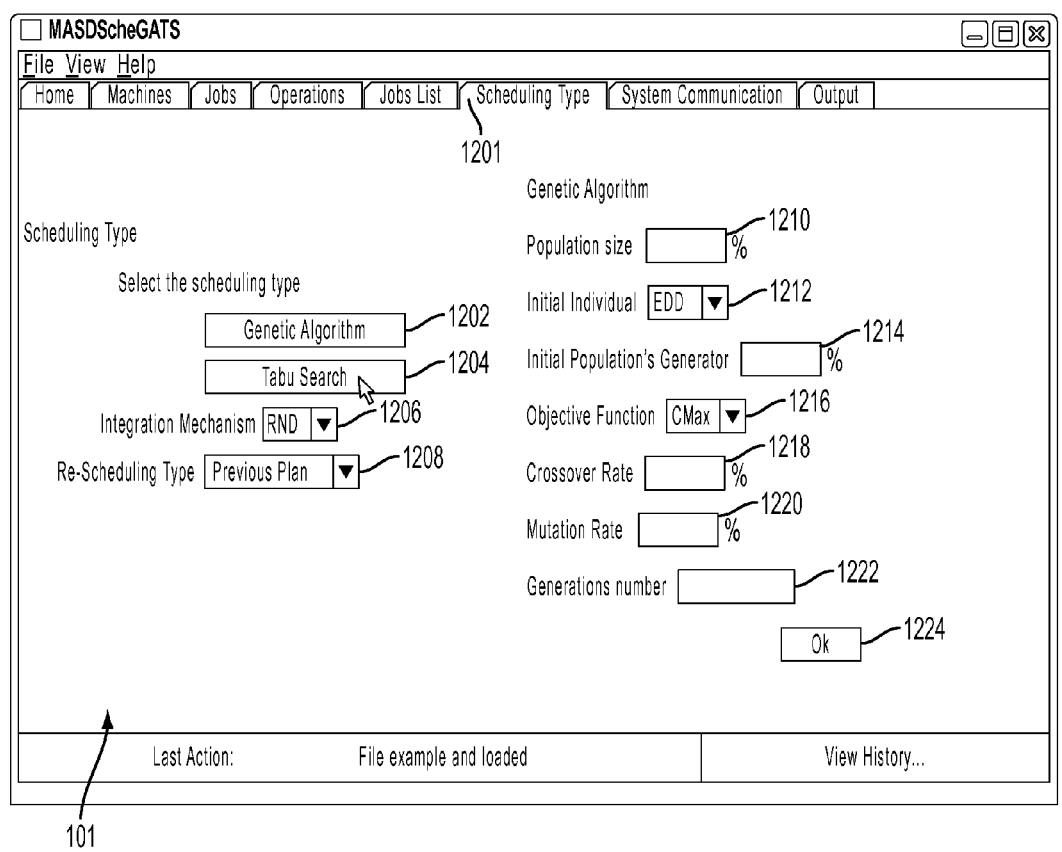

Parameterization of meta-heuristics to be used in generating a schedule may be set in the system 100. Turning to FIG. 12, the user interface 101 may include a scheduling type tab 1201. When the scheduling type tab 1201 is selected, the user interface 101 may include a Genetic Algorithm control 1202 and a Tabu Search control 1204. The genetic algorithm control 1202 and the Tabu Search control 1204 may be used to select between using a Genetic Algorithm or a Tabu Search. In FIG. 12, genetic algorithm has been selected. Accordingly, the user interface 101 may include an integration mechanism indicator/selector 1206, a rescheduling-type indicator/selector 1208, a population size input field 1210, and initial individual indicator/selector 1212 and initial population's generator input field 1214, and objective function indicator/selector 1216, a crossover rate input field 1218, a mutation rate input field 1220, a generations number input field 1222, and an OK control 1224. Parameters of a Genetic Algorithm may be input using indicators/selectors and input fields 1206-1222. Once the parameters of the genetic algorithm are input, the OK control 1224 may be selected.

Figure 13:
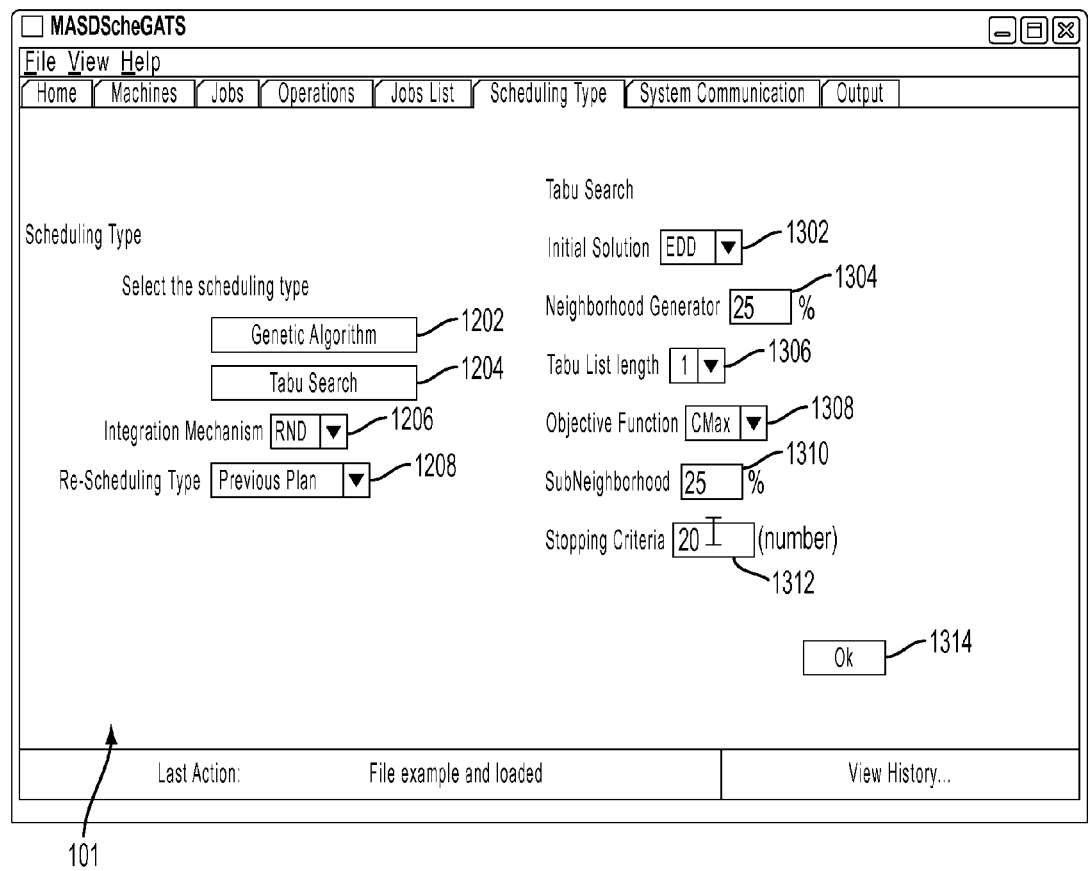

In FIG. 13, Tabu Search has been selected. Accordingly, the user interface 101 may include an integration mechanism indicator/selector 1206, a rescheduling-type indicator/selector 1208, an initial solution indicator/selector 1302, a neighborhood generator input field 1304, a tabu list length indicator/selector 1306, an objective function indicator/selector 1308, a sub-neighborhood input field 1310, a stopping criteria input field 1312, and an OK control 1314. Parameters of a Tabu Search may be input using indicator/selectors and input fields 1206, 1208, and 1302-1312. Once the parameters of the Tabu Search are input, the OK control 1314 may be selected. In the exemplary depiction, the integration mechanism RND is indicated/selected by the integration mechanism indicator/selector 1206. The rescheduling type previous plan is indicated/selected by the rescheduling-type indicator/selector 1208. The initial solution generator EDD is indicated by initial solution indicator/selector 130. 25% is input into the neighborhood generator input field 1304. 1 is indicated/selected by the tabu list length indicator/selector 1306. The objective function $C_{max}$ is indicated/selected by the objective function indicator/selector 1308. 25% is input into the sub neighborhood input field 1310. 20 is input into the stopping criteria input field 1312. Accordingly, in the exemplary depiction, Tabu Search is used with an initial solution generated by an EDD heuristic, a neighborhood generation mechanism based on task pairs interchange with a deviation of 25% of problem dimension, with a sub-neighborhood of 25% of neighborhood solutions, a tabu list with length 1 and a stopping criteria of 20 iterations. The objective is to minimize the makespan ($C_{max}$). The OK control 1314 is then selected.

Figure 14:
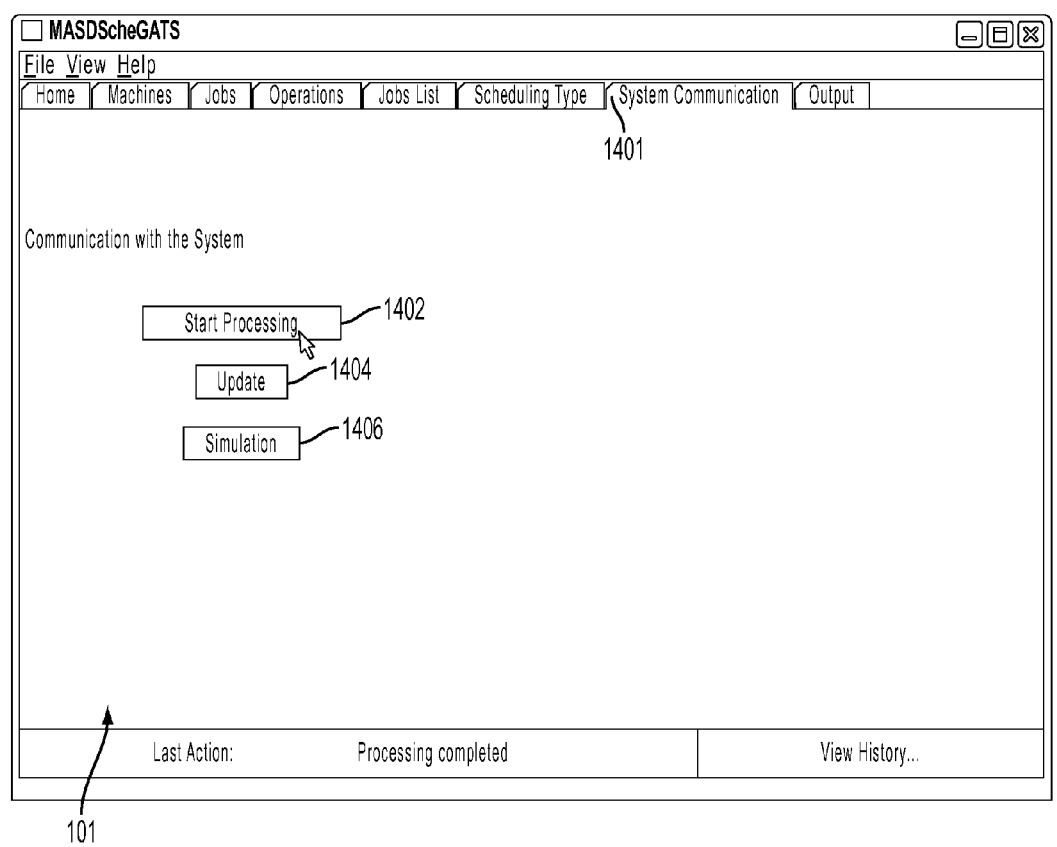

Once the parameters of meta-heuristics to be used in generating a schedule have been set in the system 100, processing may occur. Turning to FIG. 14, the user interface 101 may include a system communication tab 1401. When the system communication tab 1401 is selected, the user interface 101 may include a start processing control 1402, an update control 1404, and a simulation control 1406. Upon selection of the start processing control 1402, each SMSP may be solved independently using Tabu Search or a Genetic Algorithm, and the solutions of each SMSP may be integrated to find a solution to the EJSSP. In the exemplary depiction, the start processing control 1402 has been selected.

Figure 15:
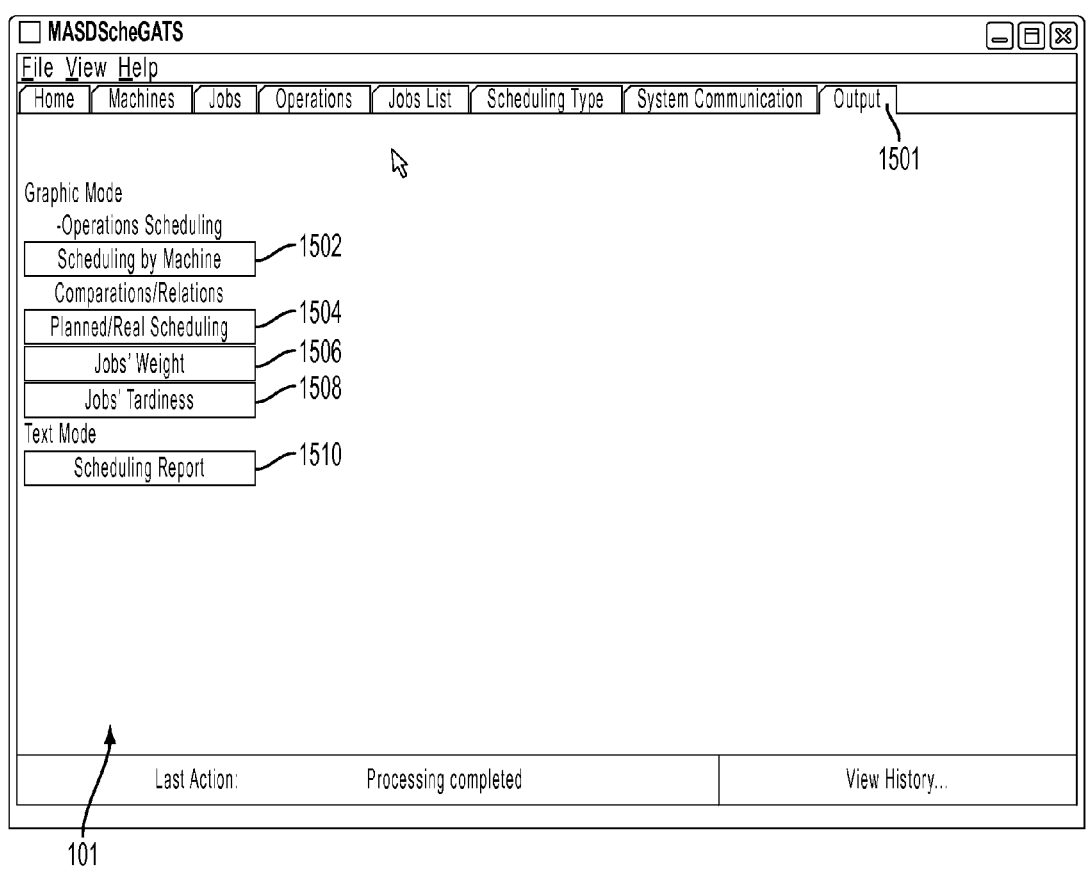
Figure 16:
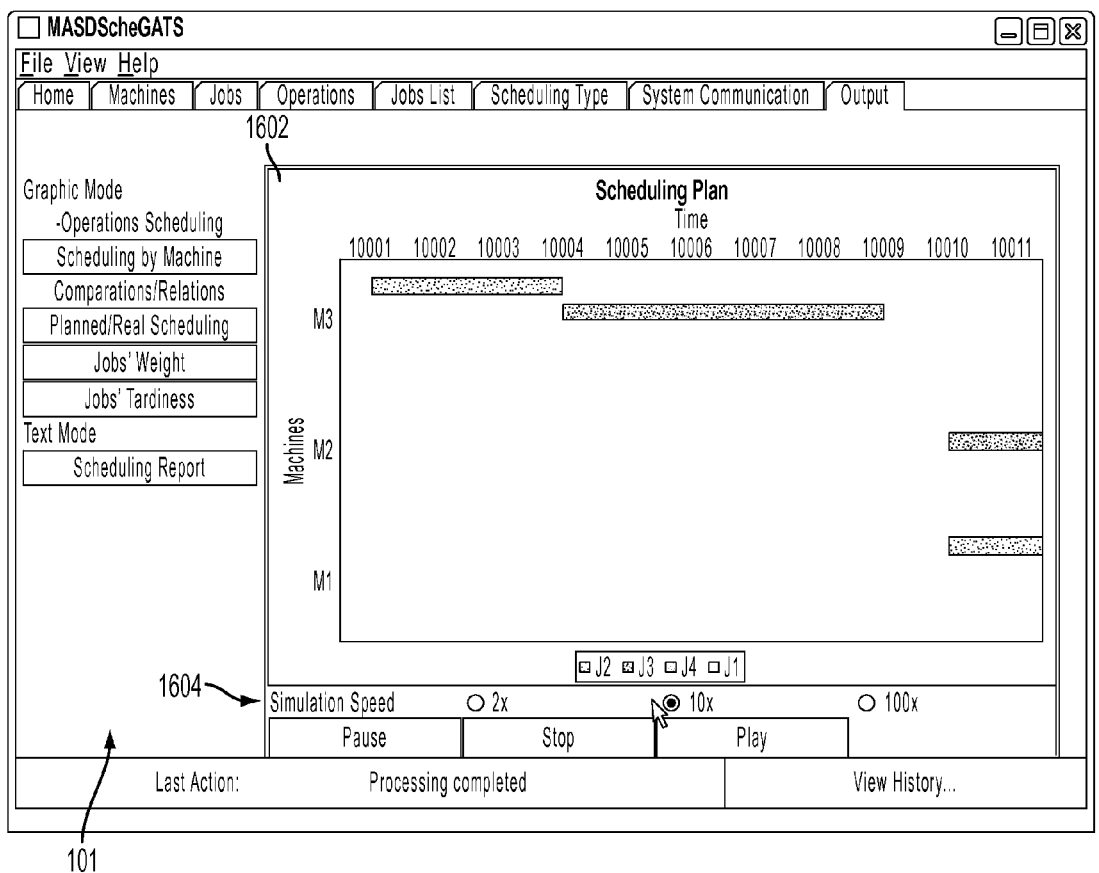

After processing, the obtained schedule may be viewed in graphical and text modes. Turning to FIG. 15, the user interface 101 may include an output tab 1501. When the output tab 1501 is selected, the user interface 101 may include a scheduling by machine control 1502, a planned/real scheduling control 1504, a jobs' weight control 1506, a jobs' tardiness control 1508, and a scheduling report control 1510. Upon selection of the scheduling by machine control 1502, a scheduling plan simulation chart 1602 (FIG. 16) may be displayed. The scheduling plan simulation chart 1602 may give the impression of movement from left to right according to time. Whether or not the scheduling plan simulation chart 1602 gives the impression of movement or is stopped or paused, and the speed of the movement may be controlled using a simulation display control 1604. Thus it is possible to view the obtained plan in a simulation mode and it is possible choose the speed.

Figure 17:
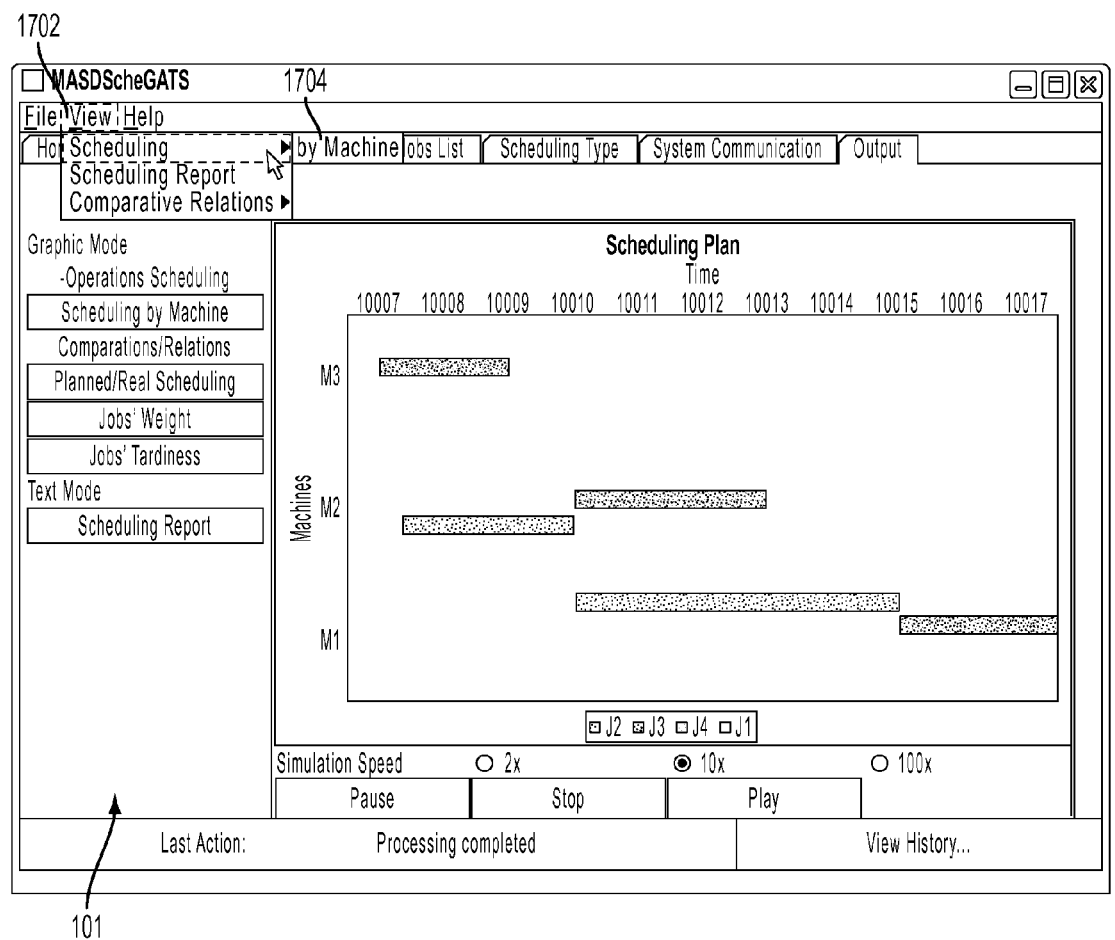
Figure 18:
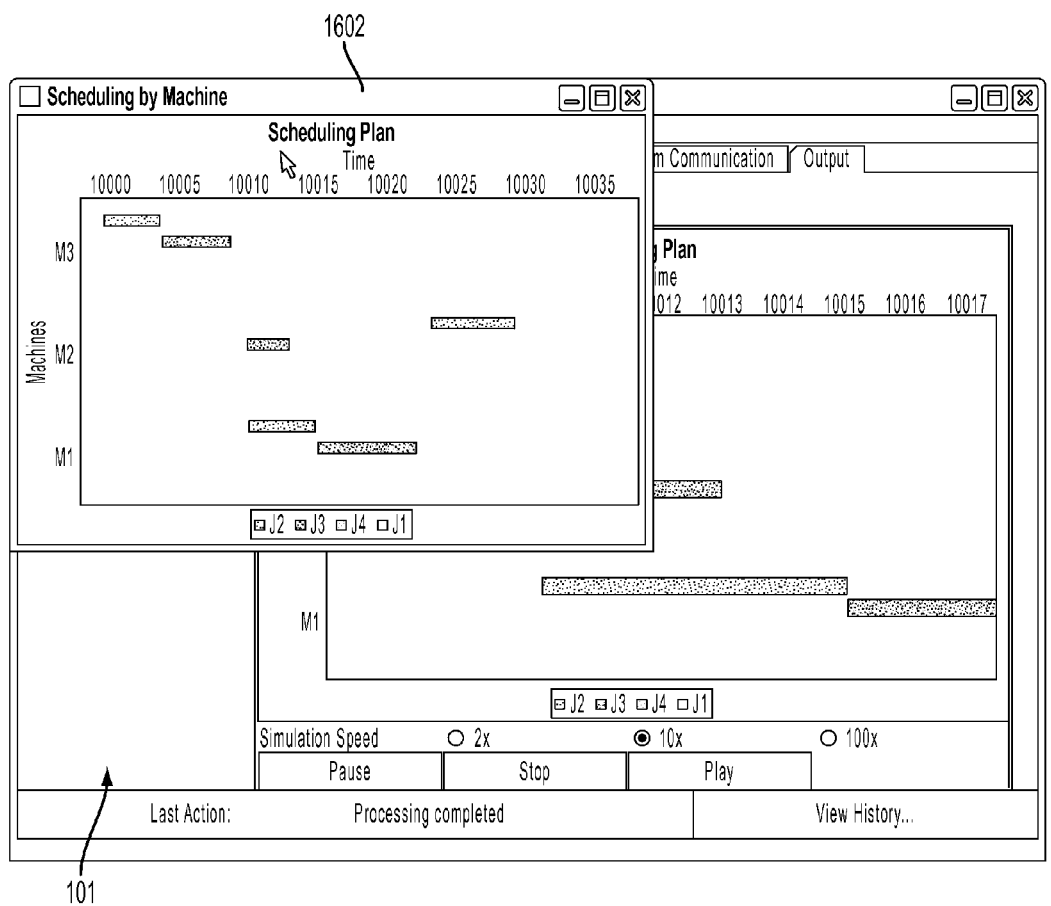
Figure 19:
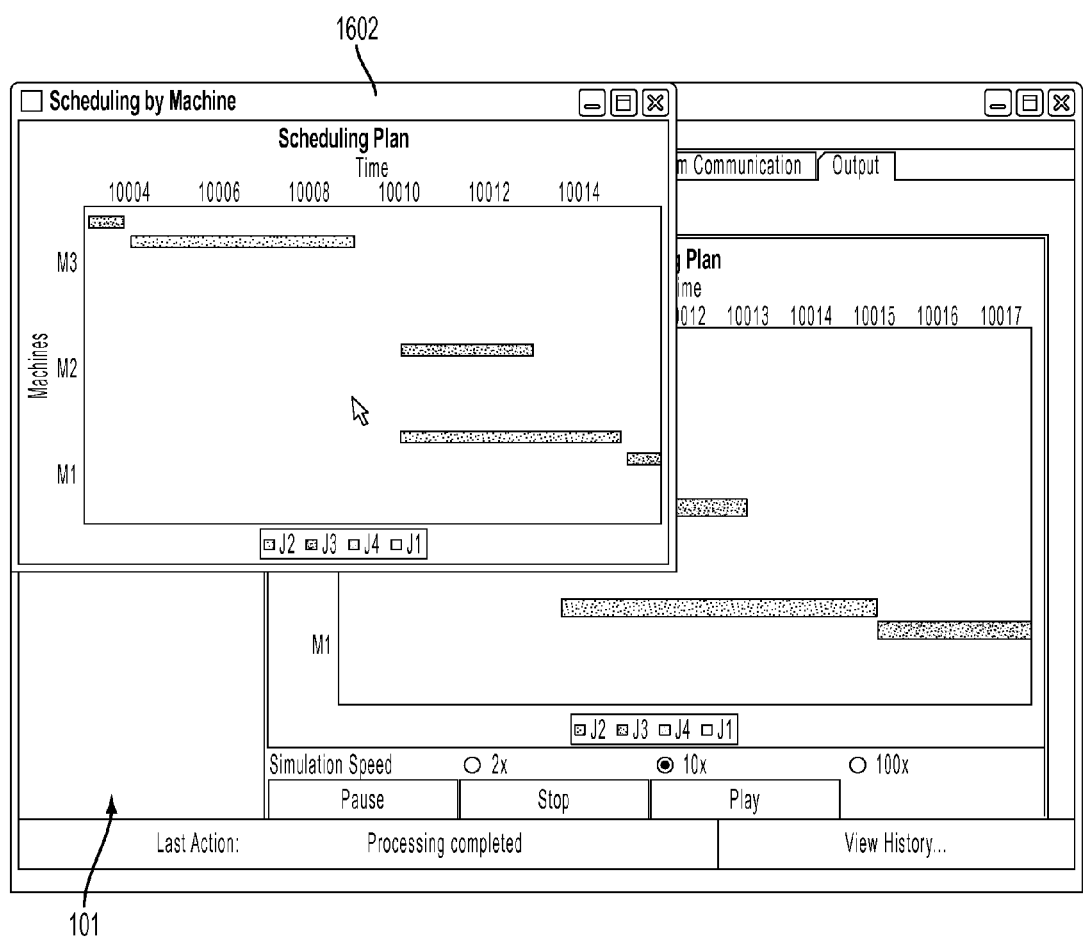
Figure 20:
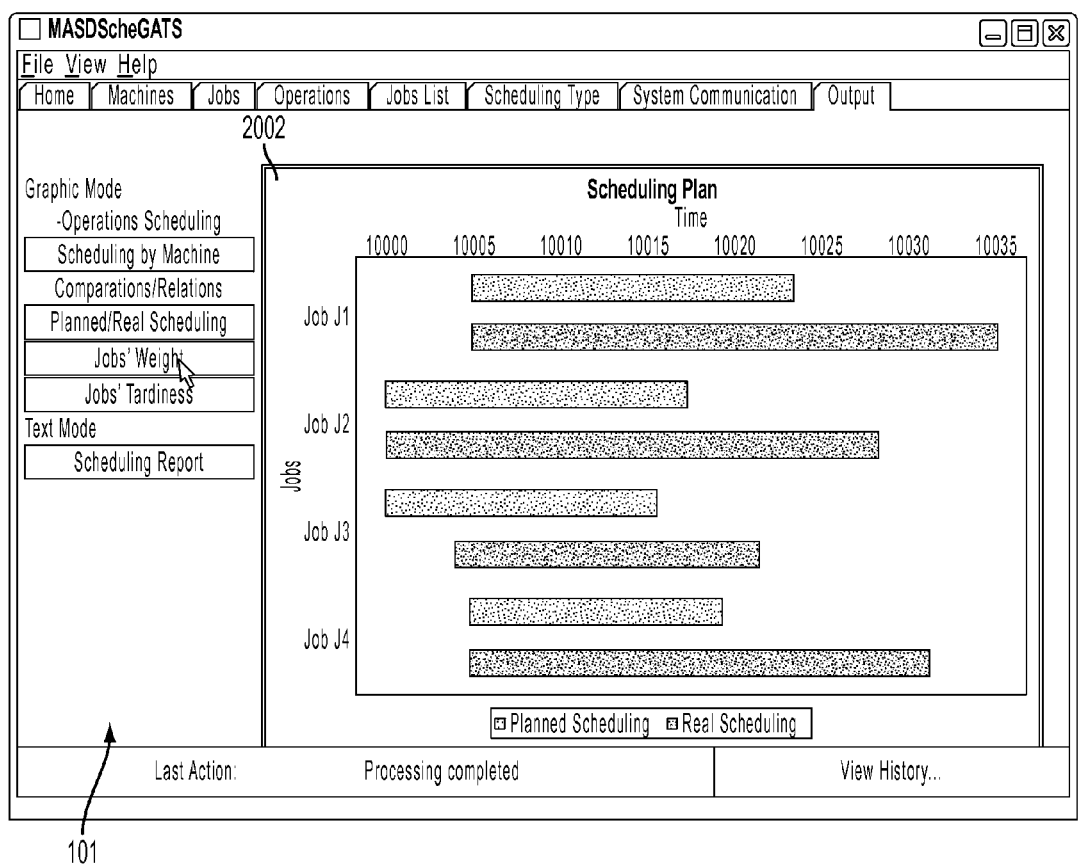
Figure 21:
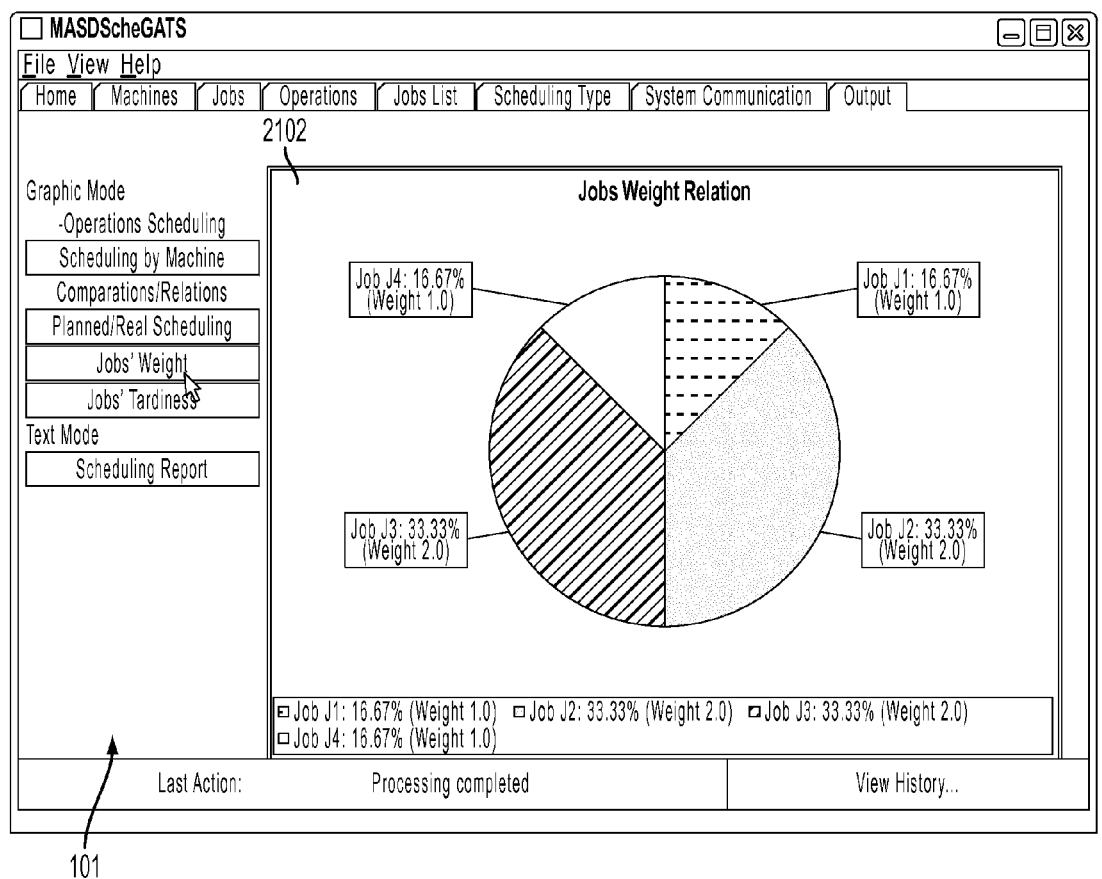
Figure 22:
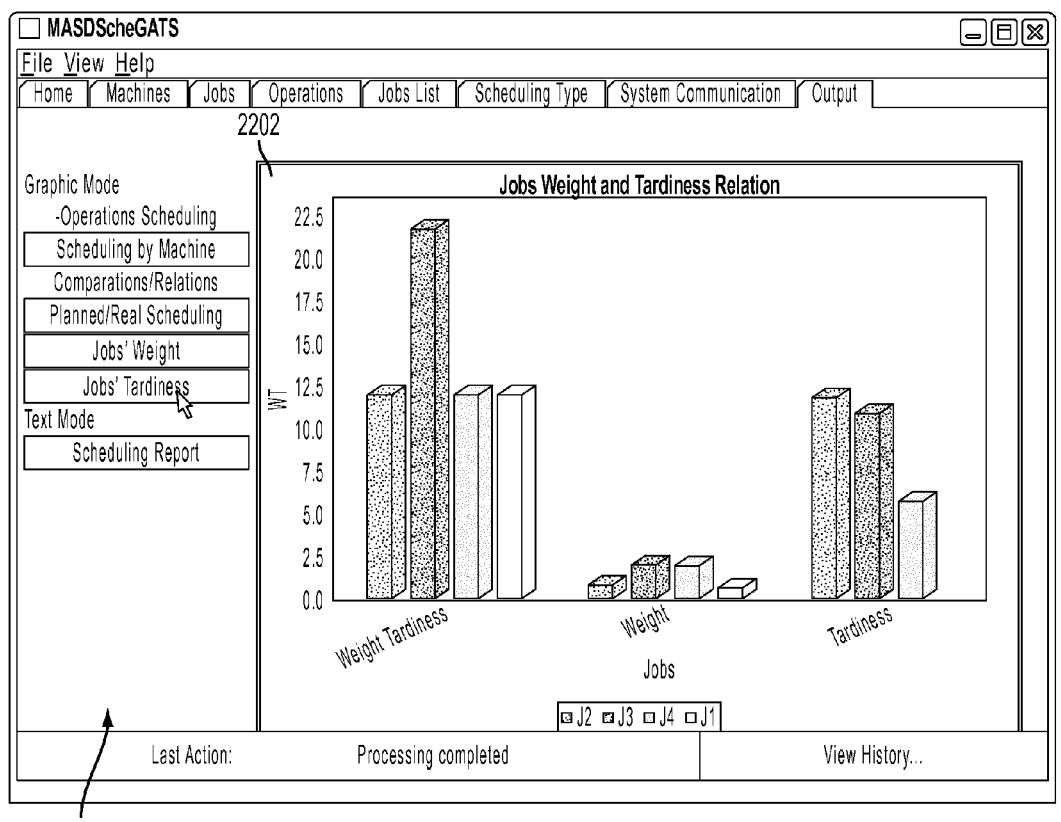
Figure 23:
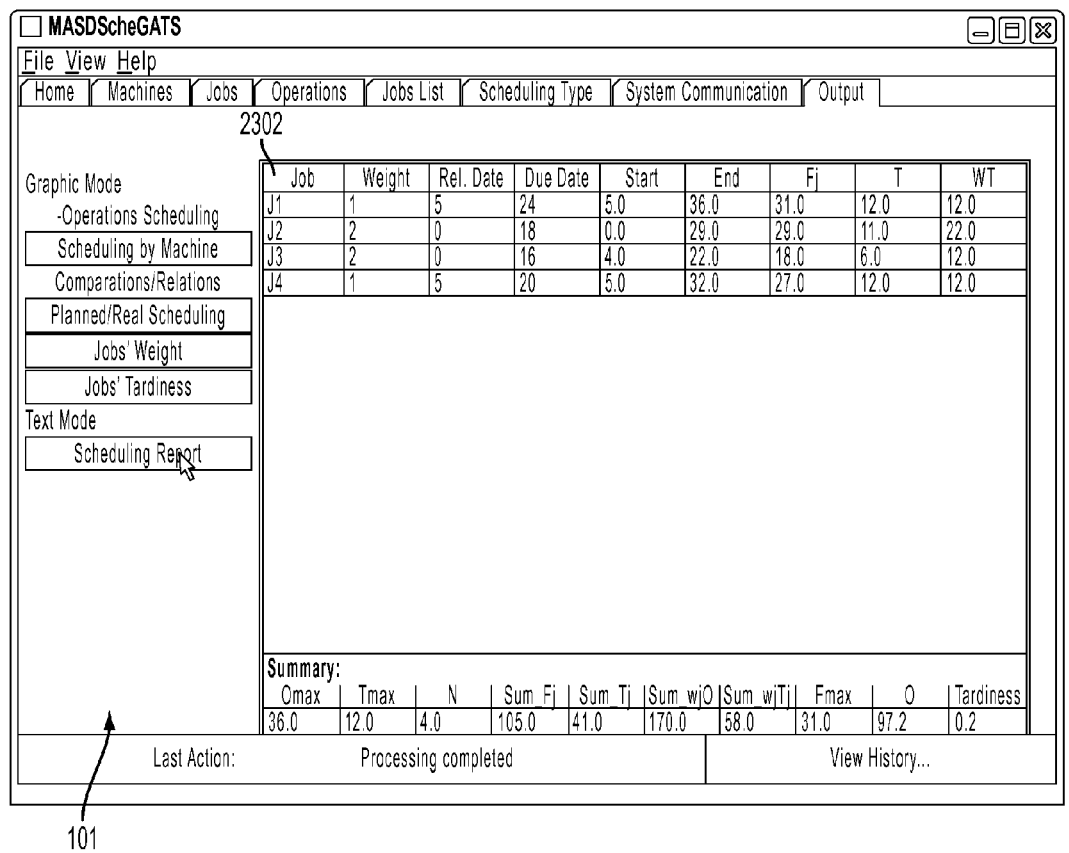

It may also be possible to view the obtained plan as in its entirety. Turning to FIG. 17, the user interface 101 may include a view control 1702. The view control may include a scheduling submenu. The scheduling submenu may include a machine control 1704. Upon selection of the machine control 1704, the scheduling plan simulation chart 1602 may be shown in its entirety (FIG. 18). From this view of the scheduling plan simulation chart 1602, a portion of the scheduling plan simulation chart 1602 may be selected and then displayed (FIG. 19).

Turning back to FIG. 15, when the planned/real scheduling control 1504 is selected, a planned/real scheduling plan 2002 (FIG. 20) may be displayed. When the jobs' weight control 1506 is selected, a jobs weight relation chart 2102 (FIG. 21) may be displayed. When the jobs' tardiness control 1508 is selected, a jobs weight and tardiness relation chart 2202 (FIG. 22) may be displayed. When the scheduling report control 1510 is selected, a text based report summary (2302) may be displayed.

Turning back to FIG. 5B, in operation 568, a determination may be made whether a perturbation has occurred. Perturbations may include, for example, the cancellation of jobs, insertion of new jobs, and changing of attributes for existing jobs (e.g., due dates and priorities). If in operation 518 it is determined that a perturbation has occurred, the method 550 may return to operation 560.

Figure 24:
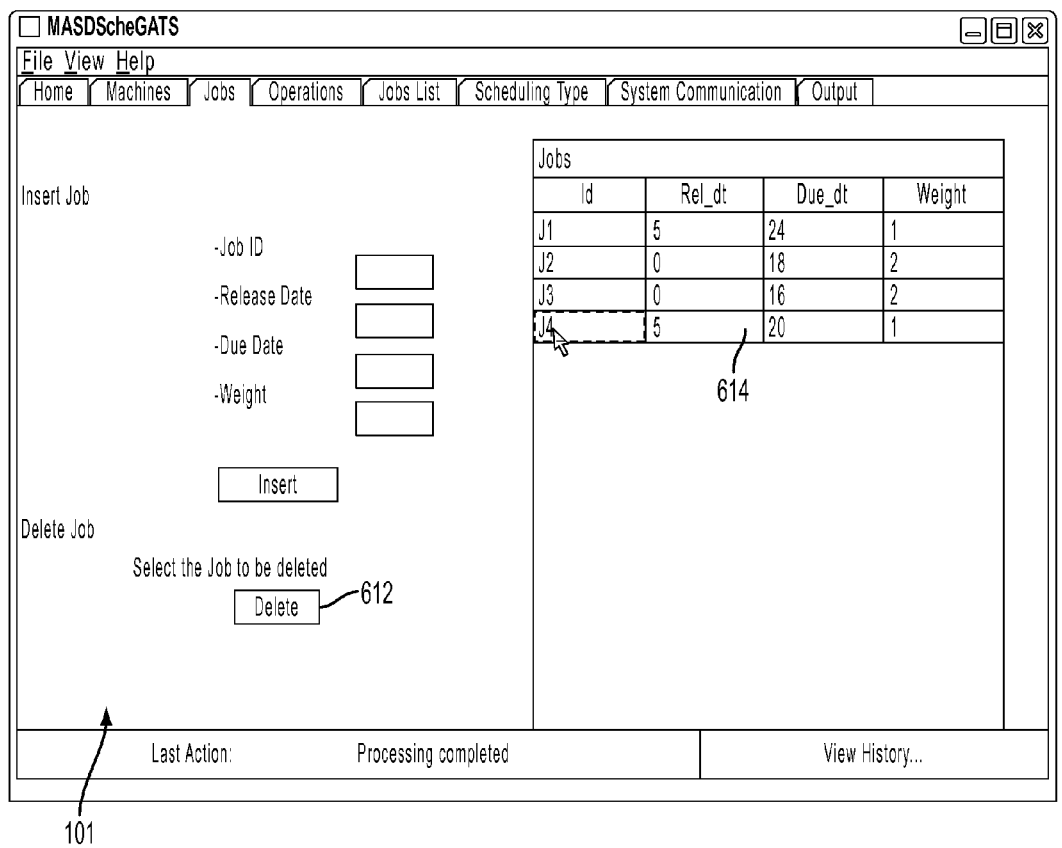
Figure 25:
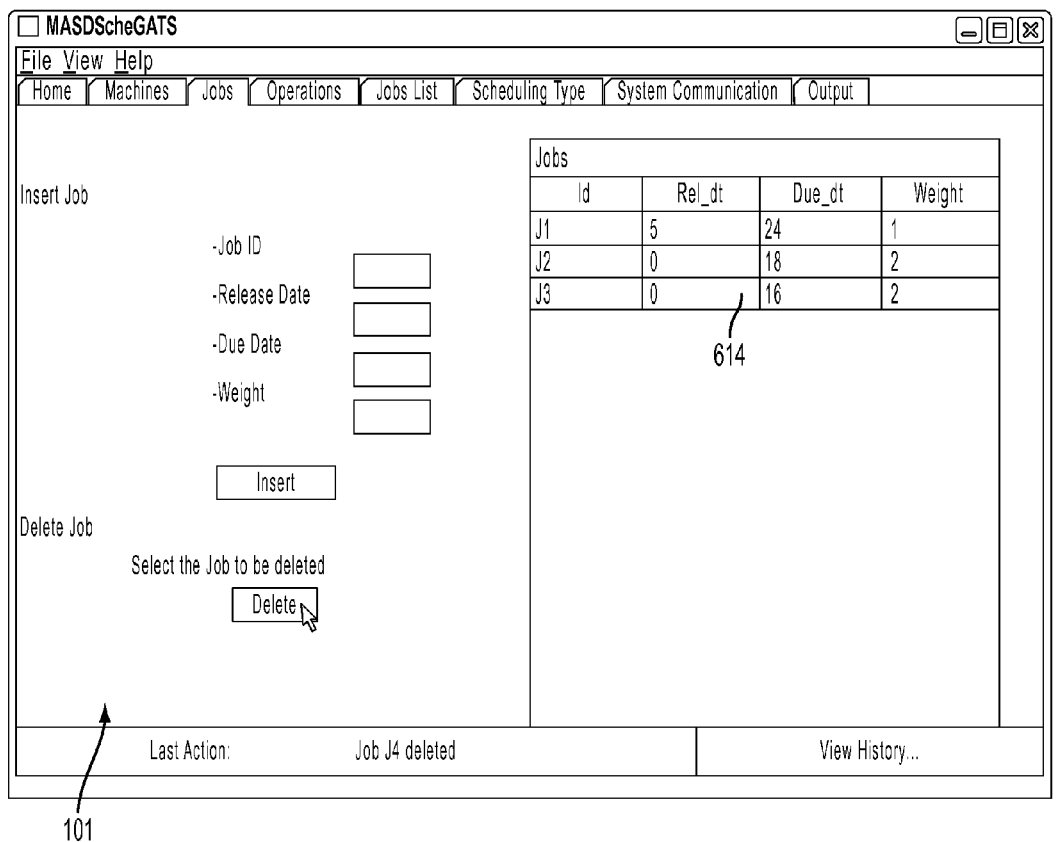
Figure 26:
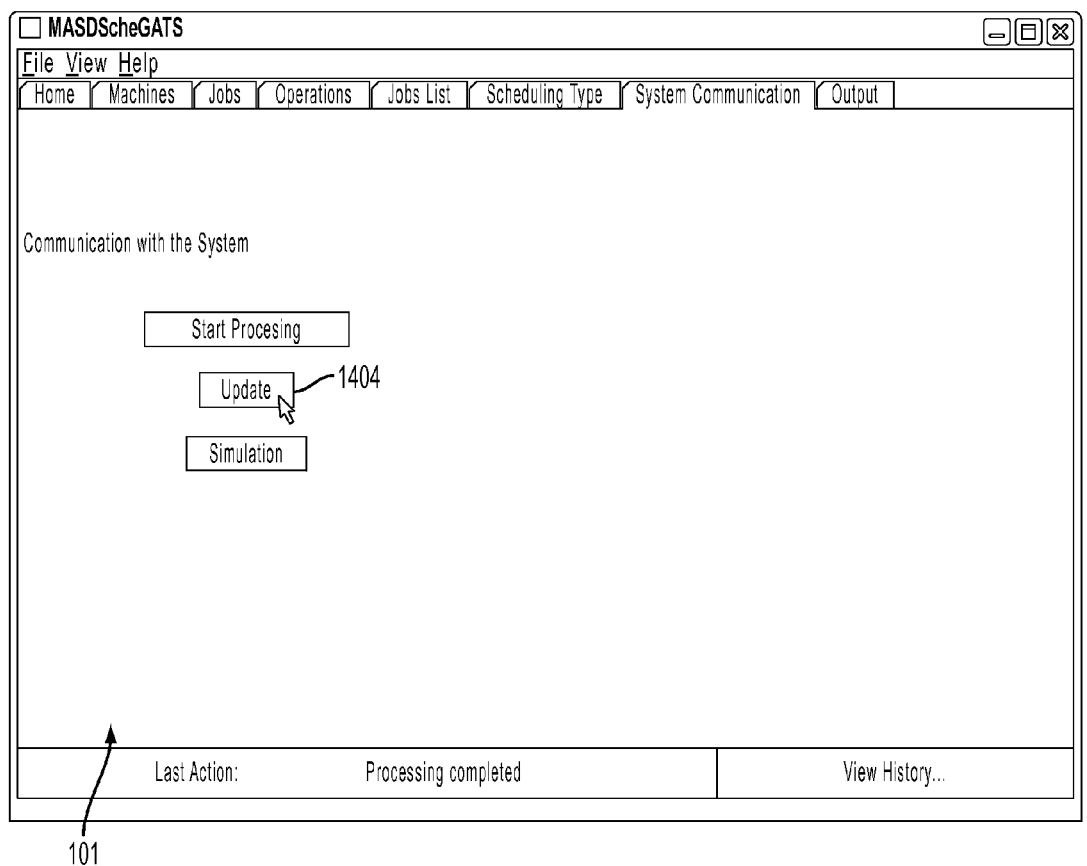
Figure 27:
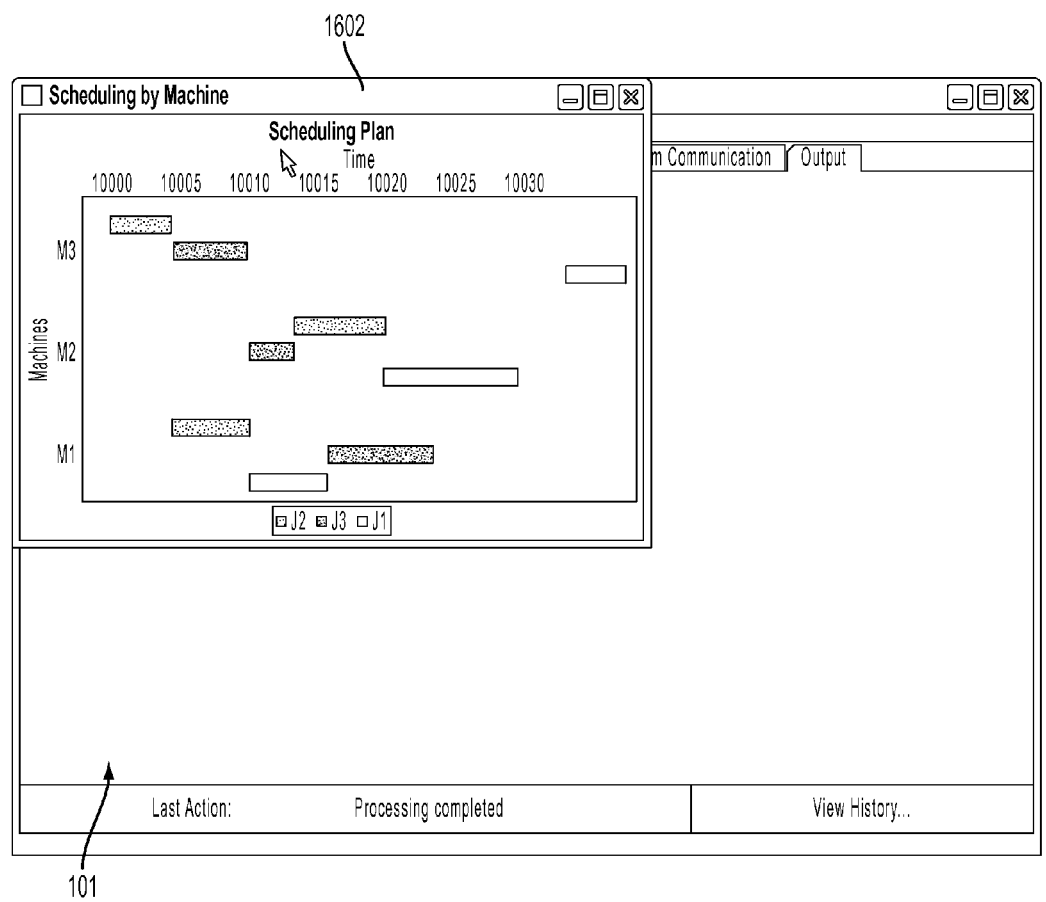

Turning to FIG. 24, in the exemplary depiction, job J4 is selected from the saved jobs table 614 displayed under the jobs tab 601, and then deleted by selecting the delete control 612. Job J4 thereafter does not appear in the saved jobs table 614 (FIG. 25). Turning to FIG. 26, the update control 1404 is selected, each SMSP is be solved independently using Tabu Search or a Genetic Algorithm, and the solutions of each SMSP may be integrated to find an updated solution to the EJSSP. By selecting the scheduling by machine control 1704, an updated scheduling plan simulation chart 1602 may be shown in its entirety (FIG. 27). In the exemplary depiction, job J4 no longer appears in the updated scheduling plan simulation chart 1602.

Figure 28:
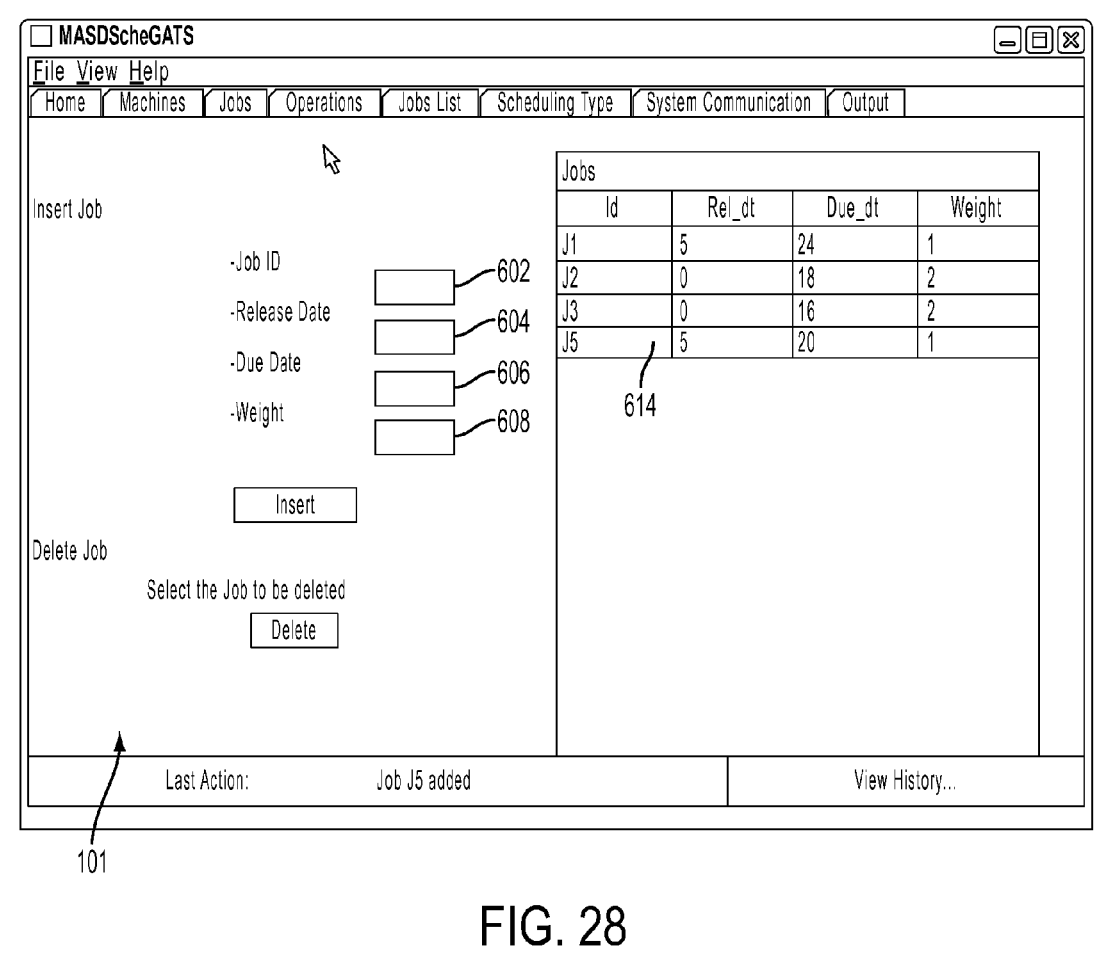
Figure 29:
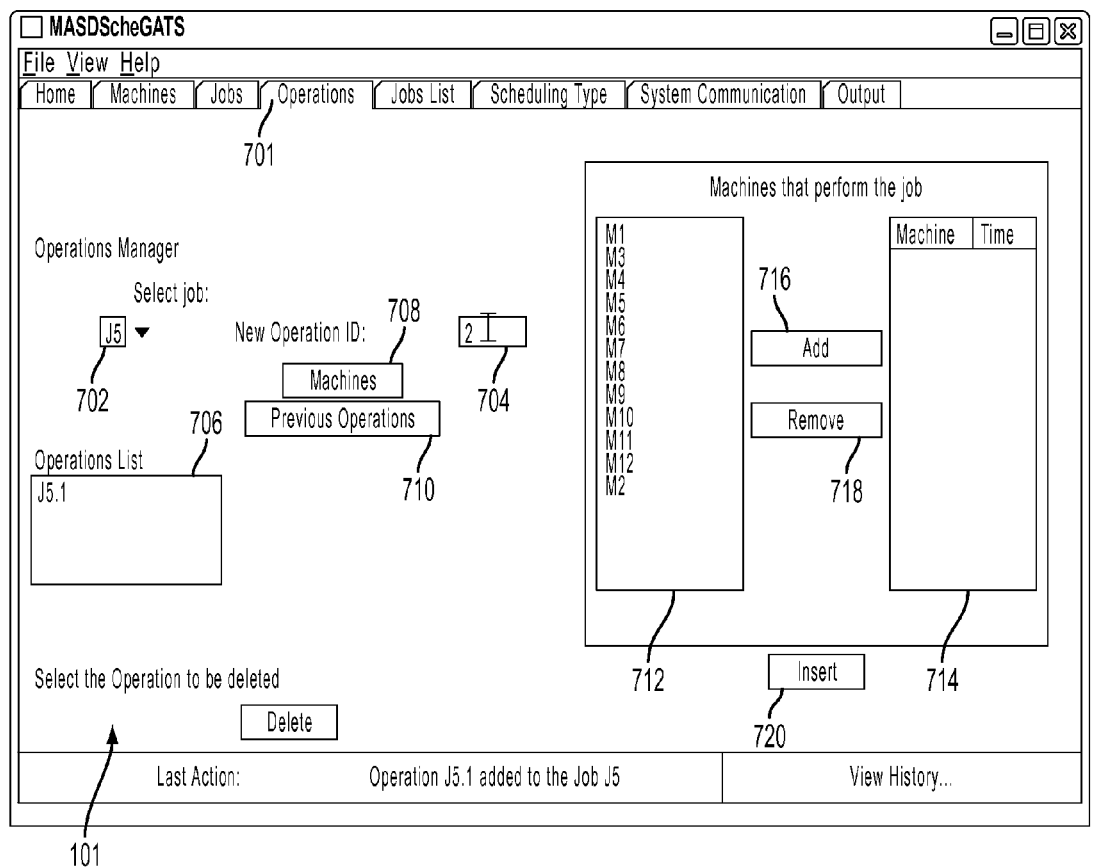
Figure 30:
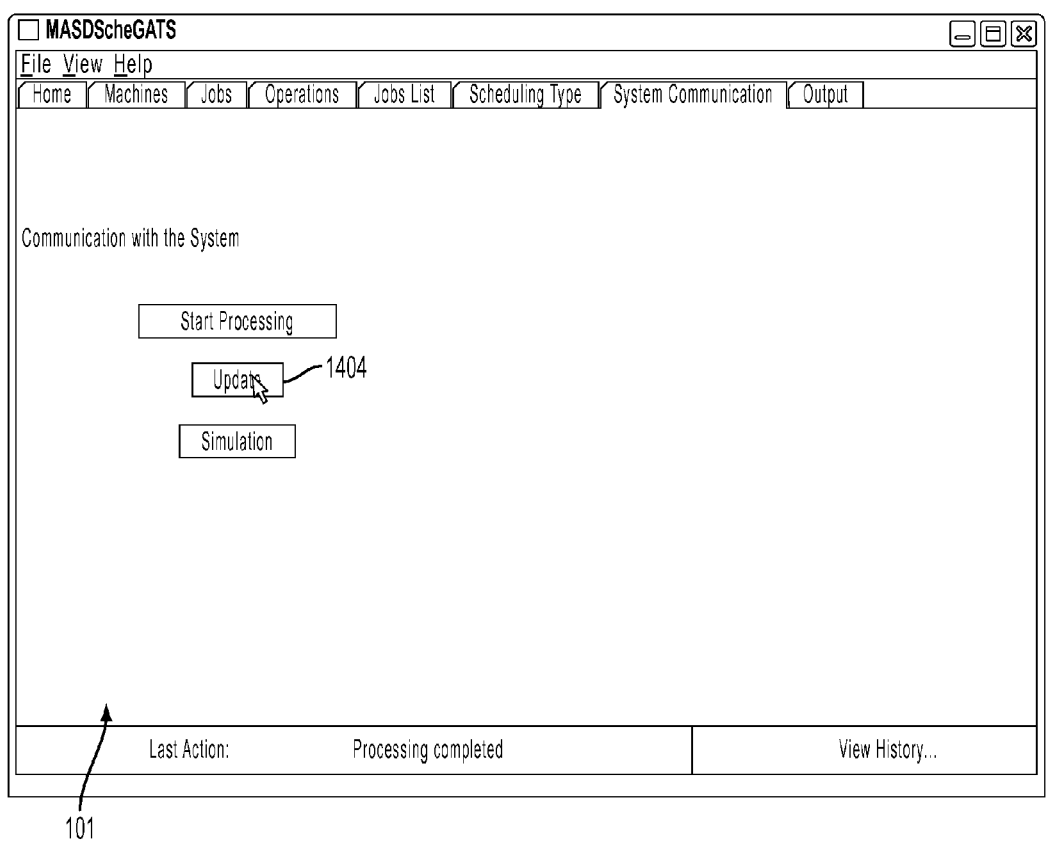
Figure 31:
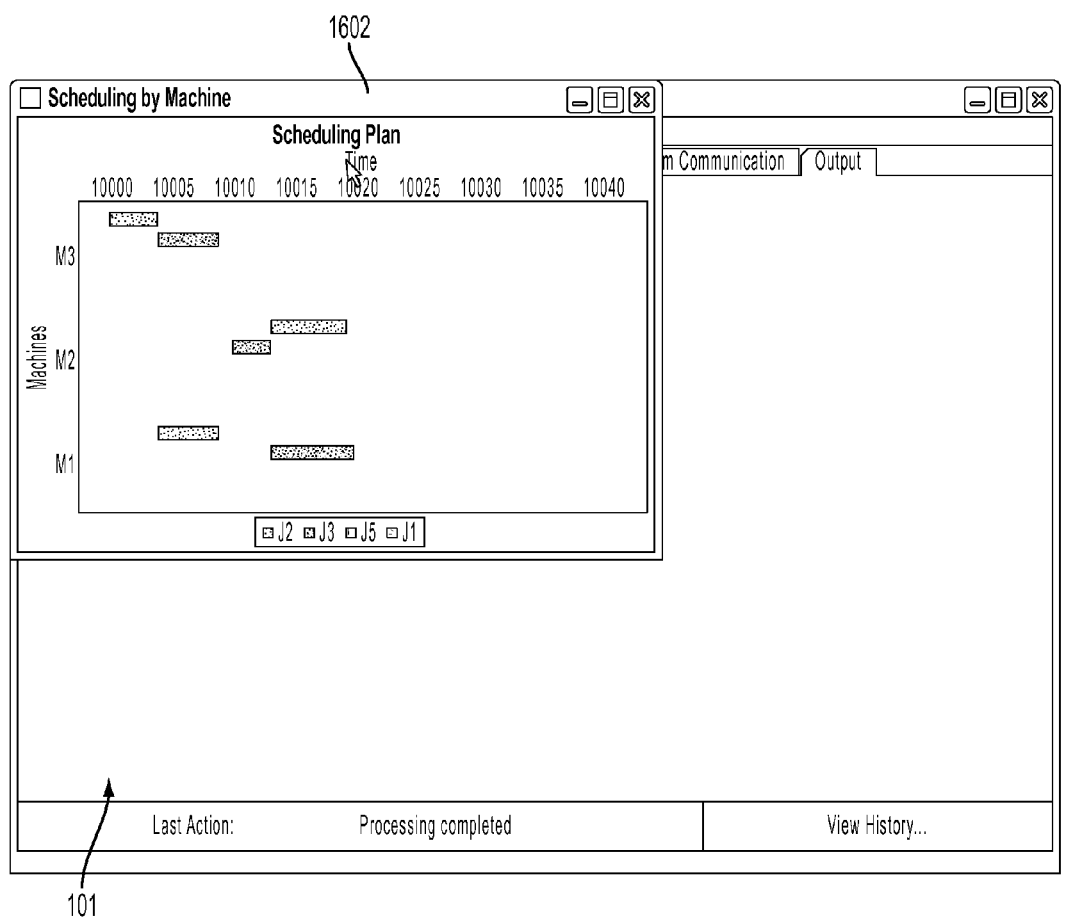

Turning to FIG. 28, in the exemplary depiction, job J5 has been added to the saved jobs table 614. Job J5 information may be entered by selecting the jobs tab 601 and using the job ID input field 602, the release date input field 604, the due date input field 606, and the weight input field 608. Job J5 includes a release date of 5, a due date of 20, and a weight of 1. Turning to FIG. 29, a production order may be defined in the system 100 for job J5 by selecting the operations tab 701 and using the job indicator/selector 702, the new operation ID input field 704, the operations list 706, the machines control 708, the previous operations control 710, the available machines list 712, the selected machines list 714, the add machine control 716, the remove machine control 718, and the insert control 720. In the exemplary depiction, Job J5 has same job routing as (now deleted) Job J4. Turning to FIG. 30, the update control 1404 is selected, each SMSP may be solved independently using Tabu Search or a Genetic Algorithm, and the solutions of each SMSP may be integrated to find an updated solution to the EJSSP. By selecting the scheduling by machine control 1704, the updated scheduling plan simulation chart 1602 may be shown in its entirety (FIG. 31). In the exemplary depiction, job J5 now appears in the updated scheduling plan simulation chart 1602.

Figure 32:
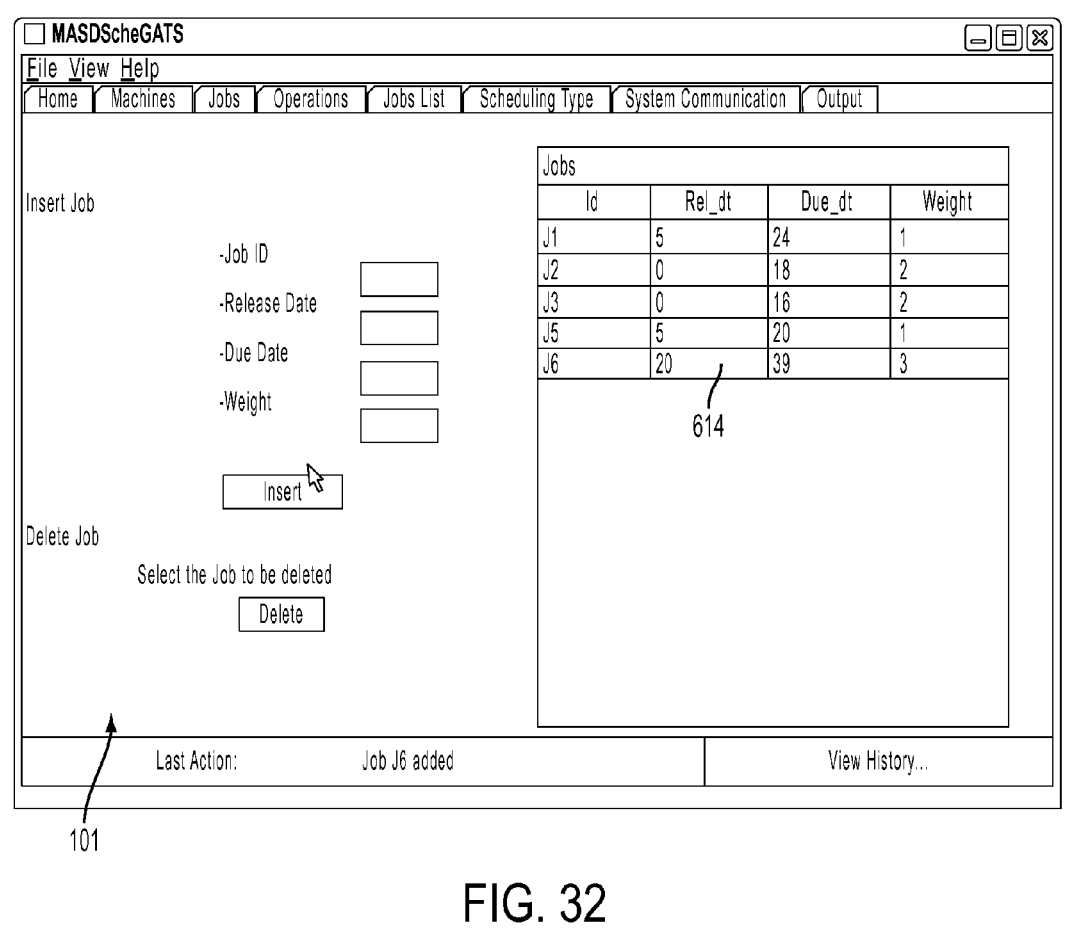
Figure 33:
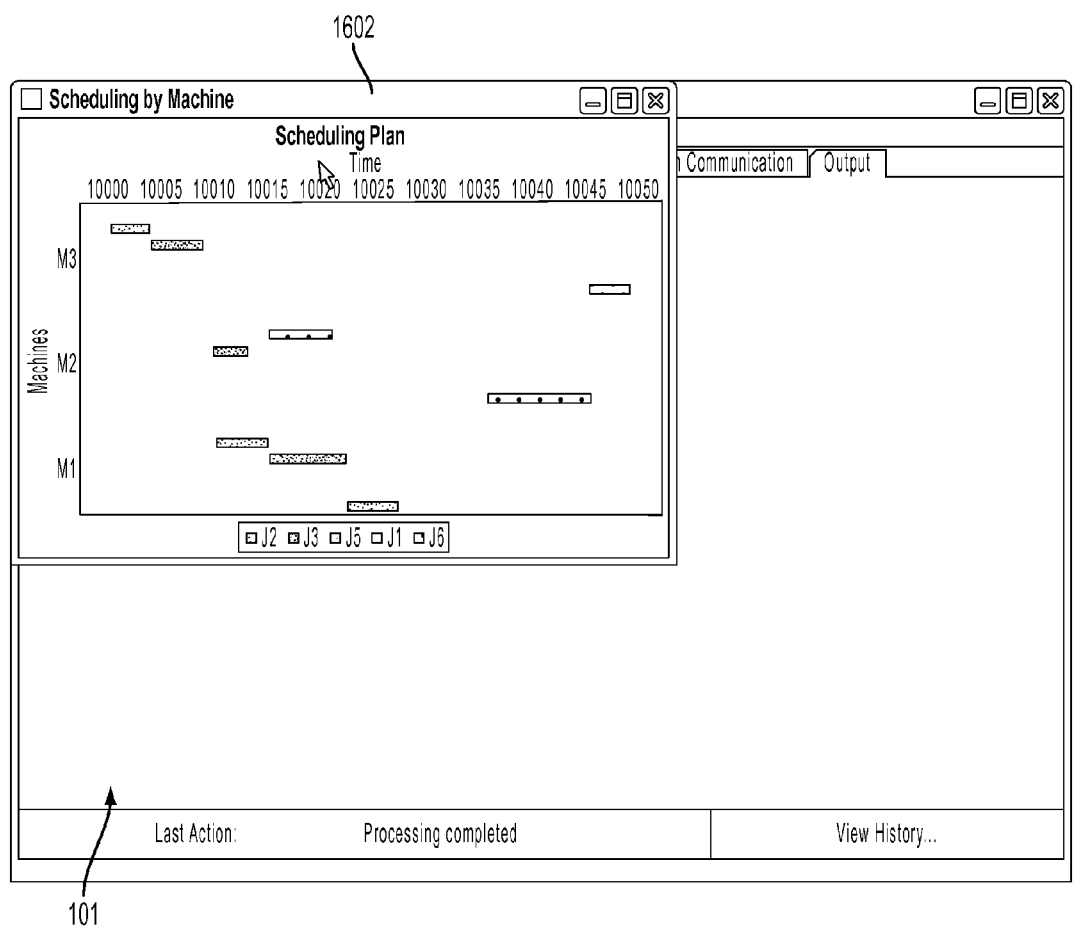

Turning to FIG. 32, in the exemplary depiction, job J6 has been added to the saved jobs table 614. Job J6 includes a release date of 20, a due date of 39, and a weight of 3. A production order may be defined in the system 100 for job J6. Operation J6.1, without precedents, is processed by machine M2 with a processing time equal to 5 time units. Operation J6.2 may be processed by machine M1 and have 10 units of time and have a precedent of operation J6.1. Operation J6.3 is preceded by operation J6.2, and is processed by machine M3 for 4 time units. Each SMSP may be solved independently using Tabu Search or a Genetic Algorithm, and the solutions of each SMSP may be integrated to find an updated solution to the EJSSP. By selecting the scheduling by machine control 1704, the updated scheduling plan simulation chart 1602 may be shown in its entirety (FIG. 33). In the exemplary depiction, job J6 now appears in the updated scheduling plan simulation chart 1602.

Turning back to FIG. 5B, If in operation 568 it is determined that a perturbation has not occurred, the method 550 may proceed to operation 570 and end.

According to an exemplary embodiment of the invention, to a multi-agent system for distributed manufacturing scheduling with Genetic Algorithms and Tabu Search may be used as a decision support system for discrete manufacturing systems in dynamic environments. Further, the system may be used as an education tool with a purpose of introducing students to scheduling and artificial intelligence theory and its applications on manufacturing intelligent systems development. Further, the system may be used in algorithm development given its extensibility and flexibility.

The multi-agent system for distributed manufacturing scheduling with Genetic Algorithms and Tabu Search may be applicable for many types of production systems (e.g., single machine, flow-shop, job shop) of products, both of single items or multi component assemblies. The system is applicable in static and dynamic environments.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Exemplary embodiments may take the form of client software or a web-based application.

Although exemplary embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A computerized scheduling method stored in a memory and executed on one or more processors, the method comprising:
    decomposing a main job shop scheduling problem as a plurality of distributable single machine scheduling problems;
    distributing the plurality of single machine scheduling problems to a plurality of single machine scheduling problem software agents, the software agents the plurality of single machine scheduling problems thereby calculating a plurality of near optimal single machine scheduling problem solutions; and
    integrating the plurality of near optimal single machine scheduling problem solutions obtained by each agent into a main job-shop scheduling problem solution said agents being capable of later cooperation to overcome inter-agent constraints of the main job shop scheduling problem solution; and
    outputting the main job shop scheduling problem solution.

2. The computerized scheduling method of claim 1, wherein the main job shop scheduling problem is a job shop scheduling problem (JSSP), an extended job shop scheduling problem (EJSSP), a flexible job-shop scheduling problem (FJSSP), an open-shop scheduling problem (OSSP) or a flow shop scheduling problem (FSSP).

3. The computerized scheduling method of claim 1, wherein the plurality of single machine scheduling problems are solved using or a genetic algorithm.

4. The computerized scheduling method of claim 1, further comprising:
    verifying a feasibility of the main job shop scheduling problem solution.

5. The computerized scheduling method of claim 4, wherein the verifying of the feasibility of the main job shop scheduling problem solution includes verifying near optimal solutions terminate with a local optimum optimum or a near-optimal solution.

6. The computerized scheduling method of claim 4, wherein if the main job shop scheduling problem solution is not feasible, a repairing mechanism is applied to the main job shop scheduling problem solution.

7. The computerized scheduling method of claim 1, wherein said cooperation comprises,
    modifying at least one of the near optimal single machine scheduling problem solutions; and
    repeating the operations of independently solving the plurality of single machine scheduling problems, including the modified at least one near optimal single machine scheduling problem, and integrating the plurality of near optimal single machine scheduling problem solutions into the main job shop scheduling problem solution.

8. A computerized scheduling method stored in a memory and executed on one or more processors, the method comprising:
    receiving for each of a plurality of jobs;
    receiving release dates for each job;
    grouping the plurality of operation due dates and the plurality of operation release dates into constituent single machine scheduling problems;
    for each single machine scheduling problem, determining estimated job release dates and estimated job due dates based on the received operation estimated due dates and operation estimated release dates;
    allocating each single machine scheduling problem to each of a plurality of resource agents in a multi-agent system;
    solving each allocated single machine scheduling problem using a genetic algorithm thereby obtaining corresponding near optimal single machine scheduling problem solutions;
    integrating the obtained near optimal single machine scheduling problem solutions into a main job shop scheduling problem solution;
    verifying a feasibility of the main scheduling problem solution, said resource agents being capable of later cooperation to overcome inter-agent constraints of the main scheduling problem solution; and
    outputting the main job shop scheduling problem solution.

9. The computerized scheduling method of claim 8, wherein the main job shop scheduling problem is a job shop scheduling problem (JSSP), an extended job-shop scheduling problem (EJSSP), or a flow shop scheduling problem (FSSP), a flexible job-shop scheduling problem (FJSSP), or an open-shop scheduling problem (OSSP).

10. The computerized scheduling method of claim 8, wherein the verifying of the feasibility of the main job shop scheduling problem solution includes verifying near optimal solutions terminate with a local optimum or near optimal schedule.

11. The computerized scheduling method of claim 8, wherein if the main job shop scheduling problem solution is not feasible, a repairing mechanism is applied to the main job shop scheduling problem solution.

12. The computerized scheduling method of claim 8,
    wherein said resource agents cooperate by modifying at least one of the near optimal single machine scheduling problems; and repeating the operations of independently solving the plurality of single machine scheduling problems, including the modified at least one near optimal single machine scheduling problem, and integrating the plurality of near optimal single machine scheduling problem solutions into the main job shop scheduling problem solution.

13. A computerized scheduling system, comprising:

a hybrid scheduling module in a multi-agent system, the hybrid scheduling module including logic configured to:

decompose a main job shop scheduling problem into a plurality of single machine scheduling problems;

allocate each single machine scheduling problem to a plurality of resource agents in a multi-agent system, each resource agent:

solving each constituent single machine scheduling problem using a genetic algorithm thereby obtaining corresponding near optimal single machine scheduling problem solutions;

integrate the plurality of near optimal single machine scheduling problem solutions into a main job shop scheduling problem solution; and output the main job shop scheduling problem solution.

14. The computerized scheduling system of claim 13, wherein the main job shop scheduling problem is a job-shop scheduling problem (JSSP), an extended job-shop scheduling problem (EJSSP), a flow shop scheduling problem (FSSP), a flexible job-shop scheduling problem (FJSSP), or an open-shop scheduling problem (OSSP).

15. The computerized scheduling system of claim 13, wherein the single machine scheduling problems are solved using a genetic algorithm.

16. The computerized scheduling system of claim 13, wherein the hybrid scheduling module logic is further configured to:

verify a feasibility of the main job shop scheduling problem solution.

17. The computerized scheduling system of claim 16, wherein the verifying of the feasibility of the main job shop scheduling problem solution includes verifying near optimal solutions terminate with a local optimum.

18. The computerized scheduling system of claim 16, wherein if the main job shop scheduling problem solution is not feasible, a repairing mechanism is applied to the main job shop scheduling problem solution.

19. The computerized scheduling system of claim 13, wherein the hybrid scheduling module logic is further configured to:

modify at least one of the near optimal single machine scheduling problem solutions; and repeat the operations of independently solving the plurality of single machine scheduling problems, including the modified at least one near optimal single machine scheduling problem, and integrating the plurality of near optimal single machine scheduling problem solutions into the main job shop scheduling problem solution.

20. A computerized scheduling system, the system comprising:

a user interface to receive due dates for each of a plurality of jobs, to receive a plurality of release times for each of the number of jobs, and to receive a structure for each of the lobs;

a hybrid scheduling module; the hybrid scheduling module including logic configured to:

group the plurality of due dates and the plurality of release times into decomposed single machine scheduling problems;

for each single machine scheduling problem, determine job release dates, job due dates and/or job penalties based on the received operation due dates and operation release dates and/or operation penalties;

allocate each single machine scheduling problem to a resource agent in a multi-agent system, each resource agent solving all allocated single machine scheduling problems using a genetic algorithm thereby obtaining corresponding near optimal single machine scheduling problem solutions;

integrate all obtained near optimal single machine scheduling problem solutions into a main and global scheduling problem solution; and verify a feasibility of the main scheduling problem solution, said agents being capable of later cooperation to overcome inter-agent constraints of the main scheduling problem wherein the user interface outputs the main job shop scheduling problem solution.

21. The computerized scheduling system of claim 20, wherein the main job shop scheduling problem is a job shop scheduling problem (JSSP), an extended job-shop scheduling problem (EJSSP), a flow shop scheduling problem (FSSP), a flexible job-shop scheduling problem (FJSSP), or an open-shop scheduling problem (OSSP).

22. The computerized scheduling system of claim 20, wherein the verifying of the feasibility of the main job shop scheduling problem solution includes verifying near optimal solutions terminate with a local optimum or near optimal solution.

23. The computerized scheduling system of claim 20, wherein if the main job shop scheduling problem solution is not feasible, a repairing mechanism is applied to the main job shop scheduling problem solution.

24. The computerized scheduling system of claim 20, wherein said resource agents cooperate by:

modifying at least one of the near optimal single machine scheduling problems; and repeating the operations of independently solving the plurality of single machine scheduling problems, including the modified at least one near optimal single machine scheduling problem, and integrating the plurality of near optimal single machine scheduling problem solutions into the main job shop scheduling problem solution.

25. The computerized scheduling system of claim 24, wherein said resource agents coordinate their respective local optimization efforts and knowledge using self-organized behavior.

26. The computerized scheduling system of claim 25, wherein the hybrid scheduling module is further configured to employ meta-heuristics as optimization techniques which are adapted to deal with dynamic problems including reusing and adapting individuals/populations in accordance with the dynamism of an associated manufacturing system.

27. The computerized scheduling system of claim 26, further comprising:

computerized scheduling self-organized modules, including self-configuration and self-parameterization modules, associated with the meta-heuristics that allows adapting to a situation being considered related to problem dimension and neighborhood/population size.

* * * * *